(12) United States Patent
Lennartz

(10) Patent No.: US 12,481,745 B2
(45) Date of Patent: Nov. 25, 2025

(54) METHOD FOR IMPROVED BIOMETRIC AUTHENTICATION

(71) Applicant: TRINAMIX GMBH, Ludwigshafen am Rhein (DE)

(72) Inventor: Christian Lennartz, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/807,245

(22) Filed: Aug. 16, 2024

(65) Prior Publication Data

US 2025/0061180 A1 Feb. 20, 2025

(51) Int. Cl.
*G06F 21/32* (2013.01)
*G06T 7/10* (2017.01)
*G06V 10/25* (2022.01)
*G06V 40/16* (2022.01)

(52) U.S. Cl.
CPC ............... *G06F 21/32* (2013.01); *G06T 7/10* (2017.01); *G06V 10/25* (2022.01); *G06V 40/172* (2022.01)

(58) Field of Classification Search
CPC .......... G06F 21/30; G06F 21/31; G06F 21/32; G06T 7/10; G06V 10/25; G06V 40/172; G06V 40/00; G06V 40/12; G06V 40/168
See application file for complete search history.

(56) References Cited

U.S. PATENT DOCUMENTS

| | | | | |
|---|---|---|---|---|
| 10,627,864 B2* | 4/2020 | Bao | ........................ | H04N 23/57 |
| 10,931,677 B1* | 2/2021 | Rose | .................... | H04L 63/0861 |
| 11,138,301 B1* | 10/2021 | Castañeda | ............ | G06V 40/197 |
| 11,321,449 B2* | 5/2022 | Kursun | ............... | H04L 63/0838 |
| 11,423,638 B2* | 8/2022 | Ye | ........................ | G06V 40/166 |
| 11,550,031 B2* | 1/2023 | Nguyen | ................ | G01S 13/867 |
| 2020/0364489 A1* | 11/2020 | Ye | ........................ | G06V 10/143 |
| 2022/0172511 A1* | 6/2022 | He | ............................ | H04N 5/04 |
| 2022/0382842 A1* | 12/2022 | Kang | ..................... | G06N 20/10 |

* cited by examiner

*Primary Examiner* — Hosuk Song
(74) *Attorney, Agent, or Firm* — Armstrong Teasdale LLP

(57) ABSTRACT

Disclosed herein is a field of biometric authentication, in particular the field of anti-spoofing. Further disclosed herein are methods, apparatuses, devices, material information and computer elements for generating biometric authentication information.

31 Claims, 12 Drawing Sheets

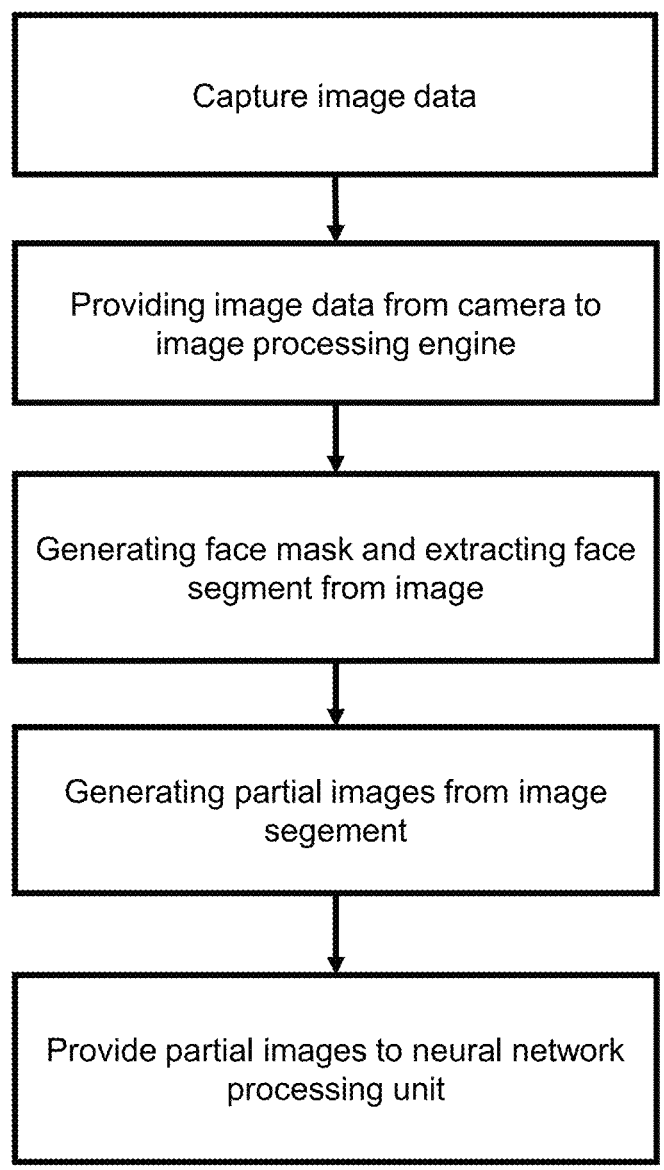

METHOD FOR IMPROVED BIOMETRIC AUTHENTICATION

CROSS-REFERENCE TO RELATED APPLICATIONS

This application claims the benefit of priority to European Patent Application No. 23191580.2, filed Aug. 16, 2023, and also claims the benefit of priority to European Patent Application No. 23191762.6, filed Aug. 16, 2023, the entire contents of which are hereby incorporated by reference herein.

TECHNICAL FIELD

The invention relates to the field of biometric authentication, in particular to the field of anti-spoofing. The disclosure relates to methods, apparatuses, devices, material information and computer elements for generating biometric authentication information.

TECHNICAL BACKGROUND

Biometric authentication processes require security measures to reduce the risk of spoofing. This is of particular importance when mobile phones are used for payments or other security sensitive operations. Such algorithms rely on image processing and neural networks for image detection. Neural networks rely on complex convolution operations that are trained based on labelled image data. For complex tasks like face authentication the number of features and their impact on the process can be difficult to assess with respect to accuracy. Hence, there is a need for improving neural network performance.

SUMMARY

In one aspect disclosed is a method for generating biometric authentication information, the method comprising:
  providing one or more pattern light image(s), wherein the pattern light image(s) comprise an image of the user under illumination with at least one infrared pattern illuminator of the device;
  generating one or more material properties from the one or more pattern light image(s);
  generating biometric authentication information by providing the generated one or more material properties to at least one layer of a neural network and/or providing the generated one or more material properties to at least one layer of a neural network e.g. trained or configured to generate biometric authentication information.

In another aspect disclosed is an apparatus for generating biometric authentication information, the apparatus comprising:
  image providing interface configured to provide one or more pattern light image(s), wherein the pattern light image comprises an image of the user under illumination with at least one infrared pattern illuminator of the device;
  a material generator configured to generate one or more material properties from the one or more pattern light image(s);
  a material property provider configured to provide the generated one or more material properties to at least one layer of a neural network configured to generate biometric authentication information and/or to generate biometric authentication information by providing the generated one or more material properties to at least one layer of a neural network e.g. trained or configured to generate biometric authentication information.

In another aspect disclosed is a method for authorizing a user of a device to perform at least one operation that requires authentication, the method comprising:
  in response to receiving an unlock request, triggering capture of one or more pattern light image(s) of the user using a camera located on the device, wherein the one or more pattern light image(s) comprise an image of the user under illumination with at least one infrared pattern illuminator located on or of the device, optionally wherein capture of one or more flood light image(s) of the user using the camera located on the device is triggered;
  generating one or more material properties from the one or more pattern light image(s);
  generating biometric authentication information by providing the generated one or more material properties to at least one layer of a neural network e.g. trained or configured to generate biometric authentication information and/or providing the generated one or more material properties to at least one layer of a neural network configured to generate biometric authentication information, optionally wherein the one or more flood light image(s) are provided to the neural network to generate biometric authentication information;
  authorizing the user to perform at least one operation that requires authentication based on the generated biometric authentication information.

In another aspect disclosed is an apparatus for authorizing a user of a device to perform at least one operation that requires authentication, the apparatus comprising:
  a trigger interface, such as a software interface, a hardware interface, a processor interface, a communication interface, a device-to-device interface or a human-machine interface, configured, in response to receiving an unlock request, to trigger capture of one or more pattern light image(s) of the user using a camera located on the device, wherein the one or more pattern light image(s) comprise an image of the user under illumination with at least one infrared pattern illuminator located on or of the device, optionally wherein capture of one or more flood light image(s) of the user using the camera located on the device is triggered;
  a material property generator, such as a processor, an image processing unit, a CPU, an ISP and/or a neural network processing unit, configured to generate one or more material properties from the one or more pattern light image(s);
  an authentication information generator, such as a processor, an image processing unit, a CPU, an ISP and/or a neural network processing unit, configured to generate biometric authentication information by providing the generated one or more material properties to at least one layer of a neural network e.g. trained or configured to generate biometric authentication information and/or to provide the generated one or more material properties to at least one layer of a neural network configured to generate biometric authentication information, optionally wherein the one or more flood light image(s) are provided to the neural network to generate biometric authentication information;
  an authorization unit, such as a processor, an image processing unit, a CPU, an ISP and/or a neural network processing unit, configured to authorize the user to perform at least one operation that requires authentication based on the generated biometric authentication information.

In another aspect disclosed is a device configured to generate biometric authentication information according to the methods or by the apparatuses disclosed herein. In another aspect disclosed is a device configured to perform the methods disclosed herein or including the apparatuses disclosed herein.

In another aspect disclosed is material property extracted from at least one pattern light image used to generate biometric authentication information according to the methods or by the apparatuses disclosed herein. In another aspect disclosed is the use of material property extracted from at least one pattern light image to generate biometric authentication information according to the methods or by the apparatuses disclosed herein.

In another aspect the present disclosure relates to a computer element, such as a computer program or computer readable medium, with instructions, which when executed on one or more processor(s), such as image processing unit(s) and/or neural network processing unit(s), or device(s) is configured to carry out the steps of the method(s) disclosed herein or is configured to be carried out by the apparatus(es) disclosed herein.

Any disclosure, embodiments and examples described herein relate to the methods, apparatuses, devices, material information and computer elements lined out above and below. Advantageously, the benefits provided by any of the embodiments and examples equally apply to all other embodiments and examples.

EMBODIMENTS

Reliable authentication and protection against spoofing is of high relevance for biometric authentication. Neural networks are generally used for such processes and the task of determining properties of the captured image can be difficult due to the variety of situations the biometric feature, such as the face, the fingertip or the retina, are scanned. Particularly in face authentication, where the user may change appearance by wearing masks, glasses, beard or the like, the variation in appearance can slow down the network or make it less accurate. By providing further information to the neural network for authentication, the operation can be performed in a more reliable manner. In particular, by providing extracted material information or properties from pattern light image(s) to at least one layer of the neural network configured to generate biometric authentication information can enhance performance of the neural network and thus the authentication process. By extracting material information from pattern light images, the materials present in the flood light image used for authentication can be discerned. In addition, by providing extracted biometric properties such as pose of biometric object from flood light image(s) to at least one layer of the neural network configured to generate biometric authentication information can enhance performance of the neural network and thus the authentication process. This aids the authentication process by using a more "informed" neural network and focusing the authentication on biometric features, like the eyes or the mouth of the face, rather than material features, such as the mask covering the mouth or the glasses in front of the eyes.

In the following, embodiments of the present disclosure will be outlined by ways of examples. It is to be understood that the present disclosure is not limited to said embodiments and/or examples.

The methods and/or apparatuses may be used for authorizing a user of a device to perform at least one operation on the device that requires authentication. The device may be any device configured to authorize a user to perform at least one operation on, in relation to and/or triggered by the device that requires authentication. The device may be or be part of a mobile phone, a tablet, a car, an autonomous vehicle, an in-car entertainment system, a door, or any other electronic system or part that requires authentication. The users may be registered with respect to one or more devices and/or operations. The device may store such user registrations for use of the device and/or for use of specific operations running on, in relation to and/or triggered by the device.

Authentication of the user may include biometric authentication. Biometric authentication may be based on biometric authentication information. The biometric authentication information may relate to biometric features and/or template features of the user. The biometric authentication information may relate to a matching score between at least one biometric feature vector generated from an image, such as a flood light image, taken on an event triggering authorization of the user of the device to perform at least one operation and at least one template vector stored for the user authorized to perform at least one operation. Biometric features and/or template features may be extracted from the image(s), such as flood light image(s), of the user. Biometric feature vector and template vector may be derived from biometric features and template features, respectively.

Biometric features may include the face, parts of the face, the retina, the fingerprint, or any other biometric feature detectable via image processing or from image taken from the user. Authentication may relate to the process of approving the identity of the user requesting to perform the at least one operation. Authentication may relate to the process of approving the user is the user registered with the device and/or the at least one operation. Authentication may relate to the process of approving the user upon requesting to perform or prior to performing the at least one operation. Authentication may relate to the process of approving the user and based on such approval performing the at least one operation.

Authorization of the user to perform at least one operation on, in relation to and/or triggered by the device that requires authentication may relate to the approval of the user requesting to perform the operation. Authorization may be bound to the user and/or operation. For example, a device may have more than one user registered. The users may be registered with respect to one or more operations. For authorization the identity of the user may be checked through biometric authentication. Further for authorization of the user for a specific operation requested by the user the registration of the user for the specific operation may be checked. Registration may include generation of a template vector stored for the user authorized to perform at least one operation. Registration may include generation of a template vector stored in relation to the user and at least one authorized operation.

Manipulating the pattern light image(s) may include randomizing the image information of or included in the region of interest, particularly the region of interest including at least one biometric feature. Manipulating the pattern light image(s) may include randomizing the image information of or included in the region of interest, particularly the region of interest including at least one biometric feature while keeping at least part of the pattern feature(s) intact. Manipulating the pattern light image(s) may include randomizing the image information of or including at least one biometric feature while keeping at least part of the pattern feature(s) intact. Manipulating the pattern light image(s) may include or may be implemented by generating one or more image cut-out(s) including part(s) of the image information of the region of interest while keeping at least part of the pattern feature(s) intact. Manipulating the one or more pattern light image(s) to suppress background texture information from a region of interest may include manipulating the pattern light image by randomizing the background texture information. Manipulating the pattern light image(s) may include or may be implemented by generating one or more image cut-outs(s) including part(s) of the image information of the region of interest. The region of interest may be a region including biometric information of the user. The region of interest may include at least the user's face or part(s) thereof. The region of interest may include at least one part of the user's face. The region of interest may include the user's face. Manipulating the pattern light image(s) to suppress background texture information from a region of interest and/or manipulating the pattern light image(s) by randomizing the image information of the region of interest, may include or may be implemented by generating one or more image cut-out(s) including part(s) of the image information of the region of interest. This allows to focus the data driven model on the pattern reflections and hence on the material signature embedded in the pattern light image signal. Manipulating the one or more pattern light image(s) to suppress background texture information from a region of interest may include performing an image augmentation technique on the pattern light image or be augmenting the image. Augmentation or manipulation may include at least one of scaling, cutting, rotating, blurring, warping, shearing, resizing, folding, changing the contrast, changing the brightness, adding noise, multiply at least a part of the pixel values, drop out, adjusting colors, applying a convolution, embossing, sharpening, flipping, averaging pixel values or the like. Augmentation or manipulation may include cropping pattern light image(s) to generate partial images.

The material property may relate to property of the pattern light image or the manipulation of the pattern light image. The material property may relate to property derivable from the pattern light image. The material property may relate to or include material information extracted from the pattern image(s). The material property or information may relate to the material type the pattern light is reflected from. The material property may relate to at least one material class, such as organic, inorganic, silicon, plastic or the like. The material property may be associated with the skin of a user. The material property may be associated with a type of organic or inorganic material. The material property may relate to the manipulated pattern light image. The material property may relate to the manipulation technique of the pattern light image.

The neural network configured to generate biometric authentication information may include a network architecture with at least one input layer, one or more hidden layers and at least one output layer. The neural network may be based on a sequential and/or parallel neural network architecture. One or more network architecture(s) may include an input layer, one or more hidden layers and an output layer that may be connected to be performed sequentially and/or parallel. At least one layer of a neural network may include or be the input layer or channel, one or more hidden layers or channels and/or the output layer or channel. The neutral network may include parameters, such as kernels, weights, biases, functional relationships, operators, constraints or the like, that are trained based on a training data set. The neural network configured to generate biometric authentication information may receive one or more images, such as flood light image(s), at the input layer and generate the biometric feature vectors, based on which the biometric authentication information may be determined. In addition, the neural network configured to generate biometric authentication information may receive one or more material properties as extracted from pattern light image(s) and/or one or more biometric properties as extracted from flood light image(s), such as those related to the position of biometric object(s) or features in the image, at the input, hidden and/or output layer of the neural network and generate the biometric feature vectors, based on which the biometric authentication information may be determined. The one or more material properties and/or the one or more biometric properties may be provided to the at least one layer of the neural network configured to generate biometric authentication information in combination and/or sequentially. The one or more material properties and/or the one or more biometric properties may be weighted and/or provided to the at least one layer of the neural network configured to generate biometric authentication information in combination and/or sequentially.

In one embodiment the one or more material properties from the one or more pattern light image(s) are generated by manipulating pattern light image(s) and extracting one or more material properties from the pattern light image(s). Generating the one or more material properties may include manipulating pattern light image(s) and generating at least one material feature vector. The at least one material feature vector may be generated from providing manipulated pattern light image(s) to at least one neural network such as convolutional neural network trained on a training dataset of manipulated pattern light image(s) and respective one or more material properties relating to the at least one material feature vector. The at least one material feature vector may be generated from providing manipulated pattern light image(s) to at least one neural network such as convolutional neural network trained to generate the at least one material feature vector related to one or more material properties.

In another embodiment the one or more pattern light image(s) are manipulated to suppress texture information from a region of interest. The one or more material properties may be generated from the one or more pattern light image(s). Manipulating pattern light image(s) may include generating partial image(s) with at least part(s) of one or more pattern feature(s). The use of one or more partial image(s) allows for less channels on the input layer of neural network for material extraction or authentication and less channels for the network architecture of the hidden layers used to analyses the image. This way the size in terms of number of parameters (neurons) per layer and/or the number of layers (network depth) can be reduced. With the lower number of parameters and size of the neural network by using partial images the performance of the neural network operation can be increased. Manipulating pattern light image(s) may include changing the distance between at least two pattern features, representing the object as a two-dimensional plane, deleting at least a part of the image, rearranging at least a part of the image, generating partial image(s) and/or any combinations thereof. The manipulation of pattern light image(s) may be executed by the one or more central processing unit(s) CPU. The pattern light images may be manipulated by partitioning the pattern image(s). Generating partial image(s) from pattern light image(s) may include cropping the pattern light image(s) to include at least part(s) of one or more pattern feature(s) and to suppress background texture information.

Manipulating pattern light image(s) may include one or more image augmentation technique(s). Manipulating pattern light image(s) may include at least one of scaling, cutting, rotating, blurring, warping, shearing, resizing, folding, changing the contrast, changing the brightness, adding noise, multiply at least a part of the pixel values, drop out, adjusting colors, applying a convolution, embossing, sharpening, flipping, averaging pixel values or the like. Manipulating pattern light image(s) may be performed for changing and/or removing at least a part of the background texture information. For example, at least a part of the background texture information may be changed and/or removed by shearing the pattern light image. Manipulation such as shearing the pattern light image may for example result in changing the distance between at least two background texture features and/or changing at least one background texture feature. Hence, performing manipulation by using at least one image augmentation technique may result in changing and/or removing at least a part of the texture information of pattern light images image.

In another embodiment manipulating pattern light image(s) includes generating a segmented image including the region of interest per pattern light image and generating per segmented image manipulated, such as partial, image(s) with at least part(s) of one or more pattern feature(s). Generating segmented image(s) may include determining a bounding box for the region of interest in the image and cropping the image to extract the region of interest. Generating segmented image(s) may include determining a bounding box for the region of interest in the image and cropping the image to extract the region of interest.

In another embodiment the manipulated pattern light image(s) are associated with a pixel location information in relation to the region of interest. The pixel location information may refer to a sub-region of the region of interest. The pixel location information may refer to a sub-region of the region of interest. The pixel location information may refer to a sub-region in relation to one or more biometric features or the biometric authentication information. The manipulated, such as partial image(s) may be associated with a pixel location information signifying the position of the manipulated, such as partial image in the pattern light image(s). Based on the extracted material information per manipulated, such as partial image and the location information a material heatmap signifying the material distribution in the region of interest, e.g. the user's face, may be generated.

In another embodiment manipulating pattern light image(s) includes generating a segmented image including the region of interest per pattern light image and generating per segmented image manipulated, such as partial image(s) with at least part(s) of one or more pattern feature(s).

In another embodiment generating one or more material properties includes providing the one or more manipulated pattern light image(s) to at least one data-driven model trained to extract one or more material properties from the manipulated pattern light image(s) and/or extracting one or more material properties from the manipulated pattern light image(s). The data-driven model is parametrized according to a training data set including manipulated pattern light images and associated one or more material properties.

The data-driven model trained to extract material information from the manipulated pattern light image(s) may include at least one neutral network. The neural network may include a network architecture with at least one input layer, one or more hidden layers and at least one output layer. The neural network may be based on a sequential and/or parallel neural network. One or more network architecture(s) including an input layer, one or more hidden layers and an output layer may be connected to be performed sequentially and/or parallel. The neutral network may include parameters, such as kernels, weights, biases, constraints or the like, that are trained based on a training data set. The data-driven model may be a neutral network. The neural network configured to data-driven model trained to extract material information may receive one or more images, such as manipulated images generated from pattern light image(s), at the input layer and generate the material information.

In another embodiment the data-driven model generating the one or more material properties generates a binary skin classifier discriminating between skin and no-skin. The data-driven model generating the one or more material properties may generate a material classifier discriminating between one or more material types. Generating the one or more material properties may include generating at least one material feature vector (or representation) from one or more manipulated, such as partial image(s) and/or matching the material feature vector (or representation) with one or more reference template vector(s) for different material types. The at least one material feature vector (or representation) may be generated from providing the manipulated, such as partial, pattern light images to a convolutional neural network trained on a training dataset of manipulated, such as partial, pattern light images and associated one or more material properties generating at least one material feature vector such as generating an output and transforming the output to the material feature vector. The material feature vector (or representation) may include a representation of the luminance and/or translucence included in the pattern light image.

In another embodiment the one or more material properties relate to at least one material type, and/or at least one characteristic of the manipulation of the pattern light image(s), e.g. generation of one or more manipulated such as partial image(s). The one or more material properties may be or include material type, and/or characteristic(s) of the manipulation of the pattern light image(s), e.g. generation of one or more partial image(s). In another embodiment the one or more material properties relate to or include, but may not be limited to or may include at least one of, at least one feature vector of at least one manipulated pattern light image(s), a size of manipulated pattern light image(s), a number of spot patterns of the manipulated pattern light image(s), a face region of the manipulated pattern light image(s), a texture, a skin type, a distance of the sensor the pattern light image was detected by to the object the pattern light image was reflected from, a translucence of the manipulated pattern light image(s) and/or a luminescence of the manipulated pattern light image(s). The one or more material properties may relate to or include skin, an organic material, an inorganic material, an organic material class and/or an inorganic material class. In another embodiment the one or more material properties relate to at least one manipulated, such as partial image representation, a manipulated, such as partial image size, a number of spot patterns in the manipulated, such as partial image, a face region of the manipulated, such as partial image, a texture, a skin type, a distance of the sensor the pattern light image was detected by to the object the pattern light image was reflected from, and/or a luminescence of the manipulated, such as partial image.

In another embodiment one or more flood light image(s) are provided. The flood light image may comprise an image of the user under illumination with at least one infrared flood illuminator of the device. The one or more flood light image(s) may be provided as input to the neural network configured to generate biometric authentication information. E.g. in response to receiving an unlock request, capture of one or more flood light image(s) and or pattern light images(s) of the user using a camera located on the device may be triggered. The one or more flood light image(s) may comprise an image captured while illuminating the user in the image with at least one infrared pattern illuminator located on the device. The food light image may comprise an image captured while illuminating the user in the image with at least one infrared flood illuminator located of the device. The user may be authenticate based on the one or more flood light image(s). The one or more flood light image(s) may include the background texture information of the pattern light images(s). While the biometric authentication uses such information of the one or more flood light image(s), the material detection is based on the pattern light reflections and suppresses the background texture information through manipulation.

The device may include at least one image processing unit and at least one neural network processing unit. The at least one image processing unit may include one or more central processing unit(s) CPU and/or one or more image signal processor(s) ISP. The image signal processor may include a dedicated-purpose processor architecture configured to perform image processing operations. The central processing unit CPU may include a general-purpose processor architecture configured to perform operations. The CPU may comprise multiple cores, for example 4 to 64, such as 6, 8 or 16. The cores may be the same or different to each other, for example a part of the cores may have a higher data throughput rate while the remaining cores may have a low energy consumption. Each core may comprise an algorithmic and logic unit (ALU), a control unit, registers and cache memory. Cache memory may be shared between different cores, in particular level 3 cache. The ALU may be capable of executing a broad range of data manipulation operations including basic arithmetic operations such as addition, subtraction, multiplication, and division; bitwise operations such as AND, NAND, OR, NOT, and XOR; logical operations such as comparing two values to determine if one is greater than, equal to, or less than the other; bit-wise operations such as shifting and rotating bits, setting and clearing individual bits; basic trigonometric functions such as sine, cosine, and tangent. An ALU may execute one operation at a time. The control unit may be configured to execute instruction fetch from memory, instruction decoding, instruction execution coordination including sending control signals to other components such as the ALU and registers, data movement between different components of the CPU and memory, control flow of instructions and data within the CPU, in particular for out-of-order (OOO) execution, timing and synchronization, or exception handling.

A CPU may have a clock frequency, i.e. a frequency at which the clock generator of the CPU generates pulses to synchronize its components, of 2.5 to 5 GHz. The context switch latency, i.e. the time it takes to save the current state of a process and load the state of another process, of a CPU may be 50 to 500 ns such as 100 ns or 125 ns. A CPU may have a bus width, i.e. the number of bits that can be transferred simultaneously between the processor and its memory, of 64 bit. A CPU may have a memory bandwidth, i.e. the rate at which data can be read from or written to the system memory, of 50 to 250 GB/s, for example 100 GB/s.

The at least one neural network processing unit may include one or more graphics processing units (GPU). A GPU may comprise multiple cores, for example 100 to 10 000 cores such as 1 536 cores, 2 304 cores, 4 608 cores, or 8 704 cores. Each core may comprise an arithmetic and logic unit (ALU) with a reduced number of operations compared to a CPU. The ALU may be configured to execute operations required for processing neural networks, such as float value addition, multiplication or exponentiation. A GPU may be optimized for matrix multiplications or additions and convolutions, wherein the operations may be executed in parallel. Such GPU may also be referred to as neural engine or tensor processing unit (TPU).

A GPU may have a clock frequency of 0.5 to 2 GHz, such as 1.0 or 1.5 GHz. The context switch latency of a GPU or TPU may be 1 to 200 μs such as 1.5 μs or 17 μs. A GPU or TPU may have a bus width of 128 to 1024 bit, for example 128 bit, 192 bit, 256 bit, 320 bit, 512 bit or 1024 bit. A GPU may have a memory bandwidth, of 300 to 1000 GB/s, for example 400 GB/s or 800 GB/s. The at least one neural network processing unit may be configured to perform at least convolutional, pooling, sub-sampling and/or flattening operations related to the neural network, such as a convolutional neural network (CNN). Such operations or parts thereof may be part of its instruction set architecture (ISA). Such operations or parts thereof may be hardware-implemented, e.g. in the ALU of the GPU.

The at least one image processing unit may include one or more central processing unit(s) CPU, wherein pattern light image(s) are provided to the central processing unit CPU configured to manipulate the pattern light image(s) and/or configured to extract material information based on the processing of the at least one data-driven model provided with the manipulated pattern light image(s). The central processing unit CPU may be configured to manipulate the one or more pattern light image(s), e.g. by generating partial image(s). The central processing unit CPU may be configured to extract the material information by executing the data driven model based on the generated manipulated, such as partial image(s). The central processing unit CPU may generate a task list for executing at least one data-driven model. by the at least one neural network processing unit. The at least one neural network processing unit may be configured to execute the data driven model and to extract and/or provide material information based on the manipulated pattern light image(s) provided to the at least one neural network processing unit.

One or more flood light image(s) may be provided to the at least one image processing unit. The at least one image processing unit may include one or more image signal processor(s) ISP. The one or more flood light image(s) may be provided to the one or more image signal processor(s) ISP for preparing a biometric authentication. One or more flood light image(s) and one or more pattern light image(s) may be captured. The one or more flood light image(s) may be provided to the at least one image processing unit, in particular the image signal processor(s) ISP, e.g. for preparing the one or more flood light image(s) for generating biometric authentication information. The one or more pattern light image(s) may be provided to the at least one image processing unit, in particular the central processing unit(s) CPU, e.g. for manipulating the one or more pattern light image(s) for generating material information. Owing to the lightweight performance of validating the images for authentication based on material information as proposed herein, the central processing unit(s) CPU can be utilized to increase performance of the authentication process and reduce bandwidth of the image signal processor(s) used for biometric authentication based on the one or more flood light image(s).

Flood light and pattern light images may be captured simultaneously. The flood light and pattern light image may comprise an image captured while illuminating the user in the image with at least one infrared flood illuminator and at least one infrared pattern illuminator located of the device. In such embodiment the flood light image and the pattern light image may coincide. The flood and pattern light image may be provided to components of the at least one image processing unit as flood light image and as pattern light image.

The prepared flood light image(s) may be provided to the at least one neural network processing unit configured to execute at least one data-driven model. trained to generate biometric authentication information from the flood light image(s). The at least one image processing unit, e,g, one or more central processing unit(s) CPU and/or one or more image signal processor(s) ISP, may generate a task list for executing at least one data-driven model. by the at least one neural network processing unit to provide biometric authentication information based on the provided flood light image(s) provided to the neural network processing unit. The task list may be provided to a task manager of the at least one neural network processing unit for executing at least one data-driven model to provide biometric authentication information based on the provided flood light image(s). The biometric authentication information may be provided to the at least one image processing unit.

In another embodiment one or more biometric properties are generated from flood light image(s). Generating one or more biometric properties may include generating at least one biometric feature vector. The at least one biometric feature vector may be generated from providing flood light image(s) to a data-driven model such as a neural network like a convolutional neural network trained on a training dataset of flood light image(s) and respective one or more biometric properties relating to the at least one biometric feature vector. The at least one biometric feature vector may be generated from providing flood light image(s) to a data-driven model such as a neural network like a convolutional neural network trained to generate biometric properties. The data-driven model such neural network trained to generate biometric properties may differ from the neural network trained to generate biometric authentication information. The one or more biometric properties and/or the one or more material properties may be provided to at least one layer of the neural network configured to generate biometric authentication information. The one or more flood light image(s) may be provided to the at least one image processing unit, in particular the central processing unit(s) CPU, e.g. for generating biometric properties. The one or more flood light image(s) may be provided to the at least one neural network processing unit for executing at least one data-driven model for generating biometric properties.

In another embodiment providing the one or more material properties and/or biometric properties to at least one layer of the neural network includes applying a bias, a weight, a functional relationship and/or an operator to at least one of an input channel, a neural network hidden layer and/or an output channel. The generated one or more material properties and/or biometric properties may be weighted or may include a weight for providing to at least one layer of the neural network. Providing the generated one or more material properties to at least one layer of a neural network configured to generate biometric authentication information may include applying at least one of a bias, a weight, a functional relationship, a constraint and/or an operator to at least one layer of the neural network, particularly at least one of the input channel of the neural network, the neural network layer and/or the output channel of the at least one layer. Providing the generated one or more material properties to at least one layer of a neural network configured to generate biometric authentication information may include applying at least one of a bias, a weight, a functional relationship, a constraint and/or an operator to at least one layer of the neural network, particularly at least one of the input channel of the neural network, the hidden layer of the neural network and/or the output channel of the neural network. The at least one of a bias, a weight, a functional relationship, a constraint and/or an operator applied to the input channel of the neural network, the neural network layer and/or the output channel of the at least one layer may be part of the training or parametrized on training of the neural network configured to generate biometric authentication information. The at least one of a bias, a weight, a functional relationship, a constraint and/or an operator applied to at least one layer of the neural network, particularly at least one of the input channel of the neural network, the hidden layer of the neural network and/or the output channel of the neural network may be part of the training or parametrized on training of the neural network configured to generate biometric authentication information. The generated one or more material properties may be weighted on providing to at least one layer of the neural network configured to generate biometric authentication information. The weighting of the generated one or more material properties may be part of the training or parametrized on training of the neural network configured to generate biometric authentication information. The generated one or more biometric properties may be weighted on providing to at least one layer of the neural network configured to generate biometric authentication information. The weighting of the generated one or more biometric properties may be part of the training or parametrized on training of the neural network configured to generate biometric authentication information.

In another embodiment the neural network configured to generate biometric authentication information generates at least one biometric feature vector based on a flood light image of the user of the device. The at least one biometric feature vector may be compared to at least one template vector related to the user to be authenticated. In another embodiment the neural network configured to generate biometric authentication includes a convolutional layer with a bias, a weight, a functional relationship and/or an operator.

In another embodiment the one or more biometric properties relate to position properties of a biometric object and/or biometric feature(s) on the image, e.g. the flood light image(s) or pattern light image. At least one biometric feature vector may relate to biometric feature(s) on the flood light image suitable for authentication. The biometric properties may relate to further properties in addition to the material properties, that may be processed prior to processing the biometric authentication information and that may be provided to at least one layer of the neural network configured or trained to generating the biometric authentication information. The biometric properties may relate to properties used to generate the biometric authentication information by providing the biometric properties to the at least one neural network. The one or more biometric properties may include facial properties such as, but not limited to, gaze, landmarks, pose including e.g. pitch, yaw, and/or roll. The biometric object may be, include or relate to a face. The one or more biometric properties may include or relate to at least one facial position property including, but not limited to, gaze, landmarks and/or pose, such as pitch, yaw, and/or roll. The one or more biometric properties may be provided to the at least one layer of the neural network configured to generate biometric authentication information. Biometric properties may relate to properties of the image, e.g. the flood light image(s) or pattern light image, of the user. For example, for the face the biometric features may include gace, face pose related features such as pitch, yaw, or roll, bounding box, or the like. Biometric property generation may be executed by the one or more central processing unit(s) CPU and/or the neural network processing unit. Material property generation may be executed by the one or more central processing unit(s) CPU and/or the neural network processing unit.

The operation requiring authentication may include unlocking the device and/or one or more components of the device and/or one or more functionalities or operations triggered to be executed or executed by device. Functionalities or operations may relate to, but are not limited to, electronic payment operations, password manager access and/or usage, in-app purchase functionalities, or the like.

The region of interest may include at least one biometric feature. The region of interest may include or be the face or one or more part(s) of the face of the user. The region of interest may include the face of the user. The patterned infrared illumination may include a periodic or regular pattern, preferably a hexagonal dot pattern with 500-5000, 800-2500, or 1000-2000 dots per image or pseudo-random structured light. The methods and apparatuses disclosed herein may further comprise the step of generating depth map from pattern light image. The depth map may provide a depth reconstruction of the pattern light image. For such reconstruction triangulation may be used. The pattern light image for generation of material information may differ from the pattern light image for generating biometric authentication information. The infrared light pattern may comprise at least one regular and/or constant and/or periodic pattern such as a triangular pattern, a rectangular pattern, a hexagonal pattern or a pattern comprising further convex tilings. For example, the infrared light pattern may be a hexagonal pattern, preferably a hexagonal infrared light pattern. The illumination pattern may comprise a number of rows on which the illumination features are arranged in equidistant positions with distance d. The rows may be orthogonal with respect to the epipolar lines. A distance between the rows may be constant. A different offset may be applied to each of the rows in the same direction. The offset may result in that the illumination features of a row are shifted. The offset δ may be δ=a/b, wherein a and b are positive integer numbers such that the illumination pattern is a periodic pattern. For example, δ may be ⅓ or ⅖. Using a periodical pattern with said offset can allow distinguishing between artefacts and usable signal. The light pattern may comprise less than 4000 spots, for example less than 3000 spots or less than 2000 spots or less than 1500 spots or less than 1000 spots. The light pattern may comprise patterned coherent infrared light of less than 4000 spots or less than 3000 spots or less than 2000 spots or less than 1500 spots or less than 1000 spots.

BRIEF DESCRIPTION OF THE DRAWINGS

In the following, the present disclosure is further described with reference to the enclosed figures:

FIG. 7 illustrates an example flowchart of methods for pre-processing pattern light images.

DETAILED DESCRIPTION

The following embodiments are mere examples for implementing the method, the apparatus, the system or applications disclosed herein and shall not be considered limiting.

Figure 1:
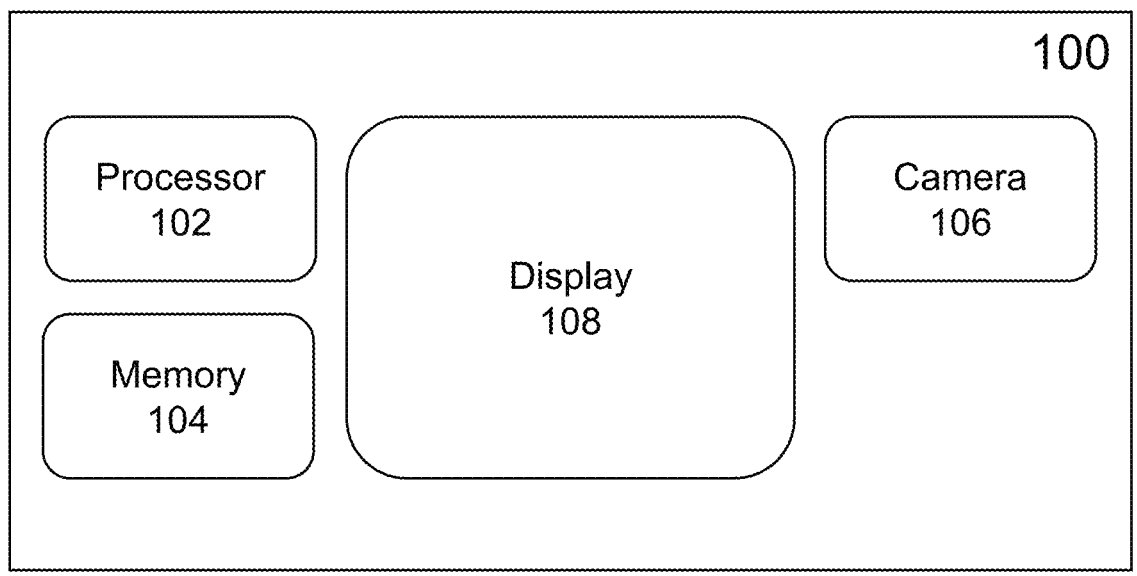
FIG. 1 illustrates a device with a processor, a memory, a camera and a display.

FIG. 1 illustrates a device 100 with a processor 102, a memory 104, a camera 106 and a display 108.

The device 100 may be any computing device which is mobile or portable. The device may be a handheld device. The device may be a mobile device with wireless or RF communication capabilities (e.g., WLAN, Wi-Fi, cellular, and/or Bluetooth). Examples of mobile devices include mobile telephones or smart phones, tablet computers, laptop computers, portable gaming devices, portable internet devices, and other handheld devices, as well as wearable devices such as smart watches, smart glasses, headphones, pendants, earpieces, etc.

The display 108 may include a LCD screen or touchscreen configured for interactive input from the user. The camera 106 may be configured to capture images of the external environment of device 100. The camera 100 may be positioned to capture images in front of the display 108. The camera 106 may be positioned to capture images of the user (e.g., the user's face) while the user interacts with display 108.

Figure 2:
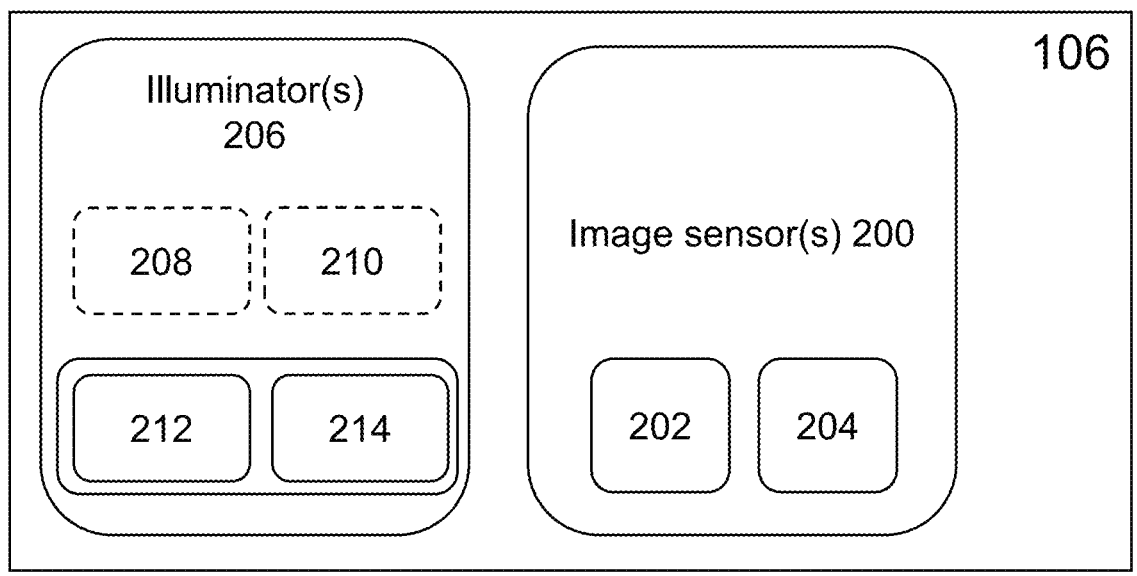
FIG. 2 illustrates an embodiment of a camera.

FIG. 2 illustrates an embodiment of a camera 106.

The camera 106 may include one or more image sensor(s) 200 for capturing digital images. The image sensor(s) 200 may include infrared (IR) sensor(s). The image sensor(s) may include, but not be limited to, charge coupled device (CCD) and/or complementary metal oxide semiconductor (CMOS) sensor elements to capture infrared images (IR) or other non-visible electromagnetic radiation. The camera 106 may include more than one image sensor 200 to capture multiple types of images. For example, the camera 106 may include both IR sensors 202 and RGB (red, green, and blue) sensors 204.

The camera 106 may include one or more illuminator(s) 206 for illuminating subjects with different types of light detected by image sensor 200. For example, camera 106 may include illuminator(s) for visible light 208 (e.g., a "flash illuminator), illuminator(s) for RGB light 210, and/or illuminator(s) 212, 214 for infrared light. The camera 106 may include a flood IR illuminator 212 and a pattern IR illuminator 214. In certain embodiments, pattern IR illuminator(s) 214 may include an array of light sources such as, but not limited to, VCSELs (vertical-cavity surface-emitting lasers). Image sensor(s) 200 and illuminator(s) 206 may be included in a single or separate chip package(s).

In certain embodiments, the image sensor is an IR image sensor and the image sensor is used to capture infrared images used for face detection, facial recognition, facial authentication, material detection and/or depth detection. For face detection, recognition and/or authentication, illuminator 206 may provide flood IR illumination to flood the subject with IR illumination and image sensor may capture images of the flood IR illuminated subject. Flood IR illumination images may be, for example, two-dimensional images of the subject illuminated by IR light.

For depth and/or material detection, illuminator 206 may provide IR illumination with a pattern.

As an example, the IR illumination may have a wavelength of 300 to 1100 nm, especially 500 to 1100 nm. Additionally or alternatively, light in the infrared spectral range may be used, such as in the range of 780 nm to 3.0 μm. Specifically, the IR illumination in the part of the near infrared region where silicon photodiodes are applicable specifically in the range of 700 nm to 1100 nm may be used. The pattern may be a pattern of light with a known and/or controllable configuration and pattern projected onto a subject. The pattern may be a pattern of light with a random, unknown and/or dynamic configuration and pattern projected onto a subject. The pattern may be regularly arranged, for example a triangular pattern, a rectangular pattern; a hexagonal pattern or a pattern comprising further convex tilings, or irregularly arranged in a structured pattern of light. In certain embodiments, the pattern is a speckle pattern. The pattern may include, but not be limited to, dots, speckles, stripes, dashes, nodes, edges, and combinations thereof. The pattern may be generated by an array of VCSELs (vertical-cavity surface-emitting lasers). One option is an hexagonal pattern with the advantage of solving the correspondence problem.

Images captured by camera may include images with the user's face (e.g., the user's face is included in the images). An image with the user's face may include any digital image with at least some portion of the user's face shown within the frame of the image. Such an image may include just the user's face or may include the user's face in a smaller part or portion of the image.

The user's face may be captured with sufficient resolution in the image to allow image processing of one or more features of the user's face for face authentication.

Figure 3:
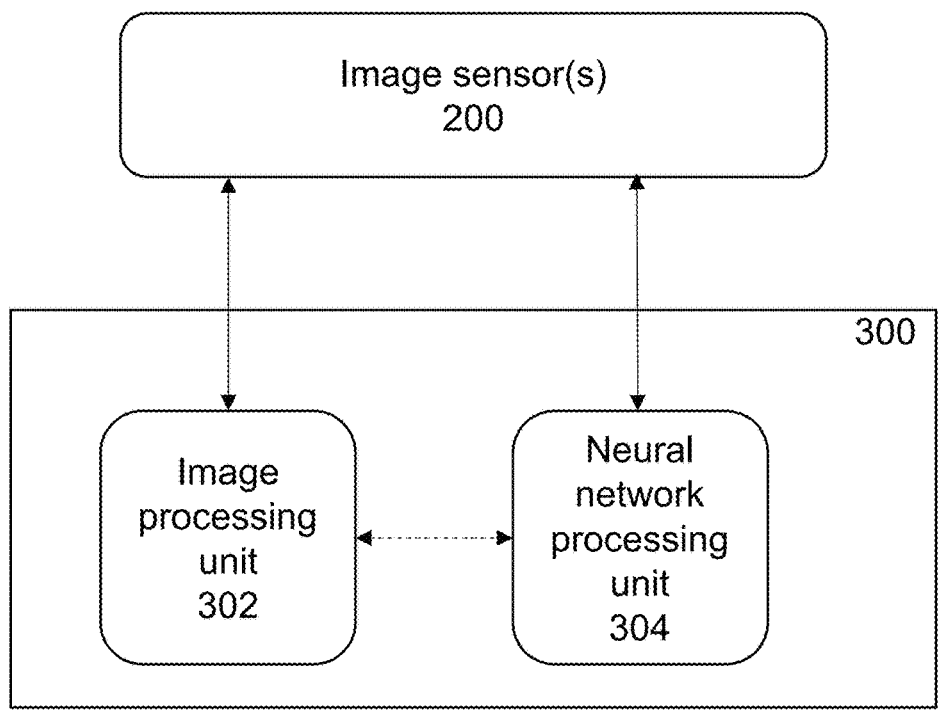
FIG. 3 illustrates an example of a processing module associated with the image sensor(s) and configured to process image signals.
Figure 4:
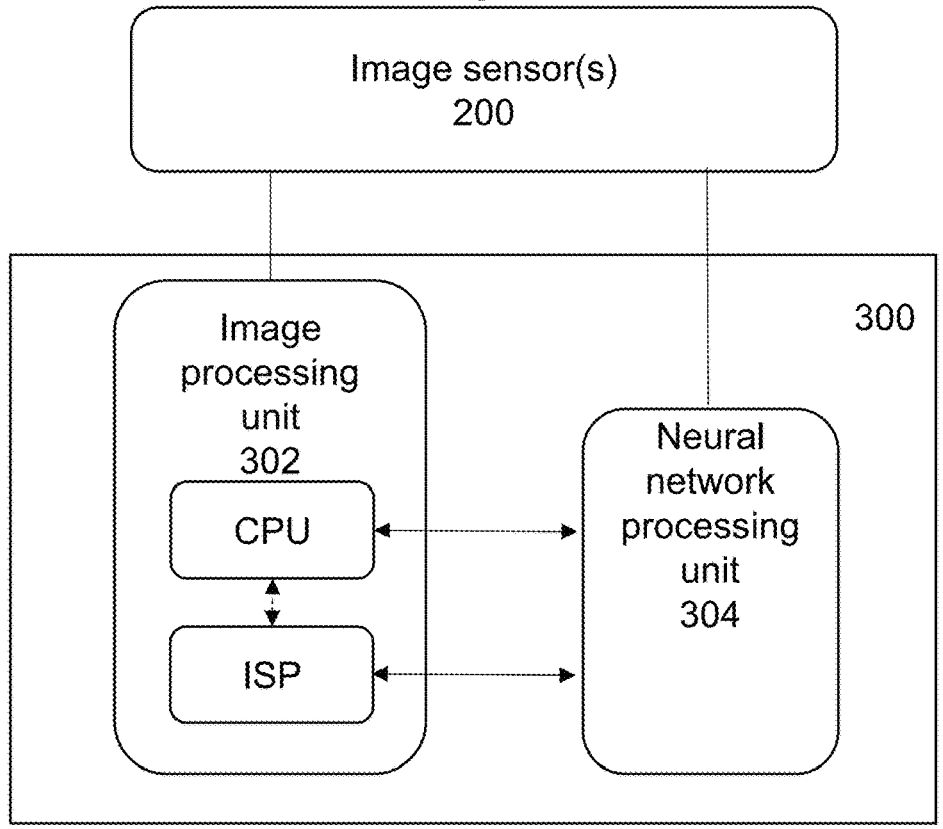
FIG. 4 illustrates another example of the processing module associated with the image sensor(s) and configured to process image signals.

FIG. 3 illustrates an example of a processing module 300 associated with the image sensor(s) 200 and configured to process image signals. FIG. 4 illustrates another example of the processing module 300 associated with the image sensor(s) 200 and configured to process image signals.

The processing module 300 may be embedded in the device 100 as illustrated in FIGS. 1 and 2.

The processing module 300 may be component of a System on Chip (SoC) Integrated Circuit (IC). The processing module 200 may include an image processing unit 302 and a neural network processing unit 304. The image processing unit 302 may perform various stages of an image processing pipeline. The image processing unit 302 may include image processing circuitry configured for digital image processing such as processing raw image data, demosaicing raw image data, image-manipulation operations such as image translation operations, horizontal and vertical scaling, lens corrections, color space conversion and/or image stabilization transformations. In some embodiments, image processing unit 302 may receive raw image data from image sensor 200 and process the raw image data into a form that is usable by other subcomponents such as the neural network processing unit 304.

The neural network processing unit 304 may include neural processor circuitry configured to process neural network operations. The neural network processor circuit may include multiple neural engine circuits configured to perform neural network operations, such as convolution, spatial pooling and local response normalization. Neural processor circuit may perform various machine learning operations based on computations including multiplication, addition and accumulation. Such computations may be arranged to perform, for example, convolution of input data and kernel data. Image or neural processor circuit may include a configurable circuit that performs these operations in a fast and power-efficient manner, while relieving CPU of resource-intensive operations associated with image processing or neural network operations. When using specialized circuitry such as circuitry configured or configurable for image or neural network processing, the operation and interaction control or planning may be handled by the CPU. In other words, the CPU may process task lists for different, specialized circuits and interaction with such circuits.

Specifically face authentication with its additional security requirements or other image-driven detection processes such as material detection, may involve different processing intensive operations reducing performance and increasing battery consumption. Thus, while relieving CPU of resource-intensive operations, the use of configured or configurable circuits tailored to special operation tasks may be managed such that performance is increased and battery consumption is reduced. One way of achieving this, is by using light weight operations, i.e. operations that are less processing intensive than others, which is of particular relevance for operations involving image processing such as face authentication or material detection.

Figure 5:
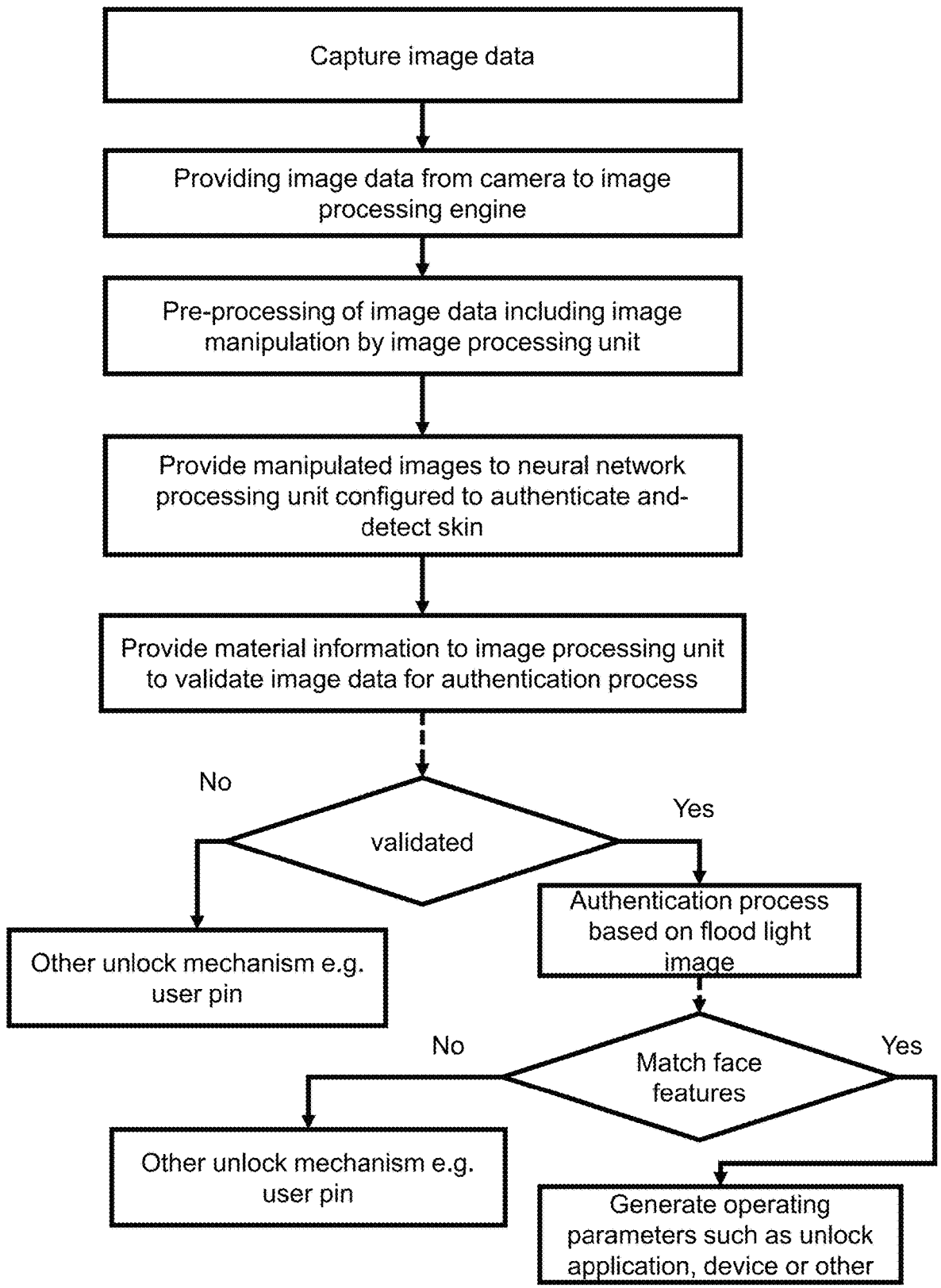
FIG. 5 illustrates a flowchart for an embodiment of a biometric authentication process using facial features and including skin detection.

FIG. 5 illustrates a flowchart for an embodiment of a biometric authentication process using facial features and including skin detection.

Image capture may be triggered by a request to authorize or authenticate the user of the device 100, e.g. to unlock the device 100. Images may be captured by camera 106. For example, one or more image(s) may be captured while the user's face is illuminated with IR flood light illuminator(s) 210 (flood light image). Further for example, one or more image(s) may be captured while the user's face is illuminated with IR pattern light illuminator(s) 212 (pattern light image).

Further for example, one or more image(s) may be captured while the user's face is illuminated with IR flood and pattern light illuminator(s) 210, 212 (flood and pattern light image). In addition, one or more image(s) may be captured while the user's face is illuminated with RGB or visible light illuminator(s) 208, 210 (RGB image).

The captured images may be provided as image raw data to the processing module 300 for authorization of the user including biometric authentication and/or skin detection. The image processing unit 302 may include image signal processor (ISP). ISP may include circuitry suitable for processing images received from camera. ISP may include any hardware and/or software (e.g., program instructions) capable of processing or analyzing images captured by camera.

The image processing unit 302 may include central processing unit (CPU). CPU may use any suitable instruction set architecture. CPU may be configured to execute instructions defined in that instruction set architecture. CPU may be general-purpose or embedded processors. It may use any of a variety of instruction set architectures (ISAs), such as the x86, PowerPC, SPARC, RISC, ARM or MIPS ISAs, or any other suitable ISA. Multiple CPUs may be included in processing module 300. In multiprocessor systems, each of the CPUs may implement the same ISA.

The captured images may be provided as image raw data to the to the image processing unit 302, in particular to the ISP and/or CPU. If the image raw data is provided to ISP and/or CPU, may depend on the event that triggered the image capture, e.g. the event to unlock the device triggering image capture. The instructions or operation set to be performed may depend on the event triggering image capture, e.g. the unlock event. The instruction or operations set to be performed may include one or more instruction(s) or operation(s) to be performed by the ISP and/or CPU. The CPU as central processing unit may provide based on the trigger event a task list including the one or more instruction (s) or operation(s) to be performed and the resources that perform such operations.

The raw image data may be pre-processed including image manipulation by the image processing unit 302. After image capture one or more pre-processing operation(s) may be triggered by the CPU. For example, the unlock event may trigger image manipulation as pre-processing operation. The image manipulation may depend on the operation that triggered the image capture, such as unlock event, and the image type, such as flood light, pattern light or RGB image.

The flood light image for example may be provided to ISP for correction manipulation and/or segmentation. The pattern light image for example may be provided to CPU for partition manipulation, masking and/or segmentation. In particular, the pattern light image may be segmented to extract the face region and/or landmarks. Further in particular, the face segment of the pattern light image may be partitioned into partial images as will be described in more detail in the context of FIGS. 7 and 8*a-c*.

The manipulated image data may be provided to the neural network processing unit 304 for authentication and/or skin detection. The neural network processing unit 304 may receive the manipulated image data, perform multiply-accumulate operations (e.g., convolution operations) on the manipulated image data based on stored kernel data, perform further post-processing operations on the result of the multiply-accumulate operations, and generate output data. In particular, the partial images derived from the pattern light image may be provided to neural network processing unit 304 for executing a data-driven model configured for skin detection. The data-driven model may be instantiated and executed on neural network processing unit. In particular, the processed flood light image(s) may be provided to neural network processing unit 304 for executing a data-driven model. configured for authentication based on templates. The data-driven model. may be instantiated and executed on neural network processing unit 304.

For instantiation and execution, the manipulated image data may be split into smaller pieces of data for parallel processing at multiple neural engines included in the neural network processing unit. Often multiple cycles of operations are performed to generate output for a task associated with a neural network. A compiler executed by CPU may analyze the hierarchy and nodes of the neural network and determine how the manipulated image data is to be split based on the hardware constraints of the neural network processing unit 304. One of the functions of the compiler may be to determine how manipulated image data is to be split into smaller data units for processing at the neural engines of the neural network processing unit 304, and how the processing is to be iterated to produce the result for tasks.

Another function may be to determine the task list for the neural network processing unit 304.

The neural network to be executed may include network layers or sub-layers that are instantiated or implemented as a series of tasks executed by the neural network processing module.

For example, a neural network may include network layers (or sub-layers) including convolution layers with sub-layers and pooling layers. The neural network may be instantiated by the neural network processing module 304. To do so the neural network is converted into a task list to become executable by the neural network processing module 304. The neural network is converted by the CPU to the task list. The task list includes a linear link-list defining a sequence of tasks including tasks per convolution layers, sub-layers and/or pooling layers. Each task may be associated with a task descriptor that defines a configuration of the neural network processing module 304 to execute the task. Each task may correspond with a single network layer of the neural network, a portion of a network layer of the neural network, or multiple network layers of the neural network. Based on the task list generated by the CPU and provided to the neural network processing module 304, the neural network processing module 304 instantiates the neural network by executing the tasks of the task list under the control of the neural task manager.

Neural task manager may receive a task list from a compiler executed by CPU, store tasks in its task queues, choose a task to perform, and send instructions to other components of the neural processor circuit for performing the chosen task. The neural task manager 310 may include one or more task queues 1004. Each task queue 1004 is coupled to the CPU 208 and the task arbiter 1002. Each task queue 1004 receives from the CPU 208 a reference to a task list 904 of tasks that when executed by the neural processor circuit 218 instantiates a neural network 900. The reference stored in each task queue 1004 may include a set of pointers and counters pointing to the task list 904 of the task descriptors 1012 in the system memory 230. Each task queue 1004 may be further associated with a priority parameter that defines the relative priority of the task queues 1004. The task descriptor 1012 of a task specifies a configuration of the neural processor circuit 218 for executing the task.

In particular, the partial images derived from the pattern light image may be provided to neural network processing unit 304 for executing a data-driven model. configured for skin detection.

The data-driven model to be instantiated and executed on neural network processing unit 304 is described in more detail in the context of FIG. 8. The result of the skin detection may be provided to image processing unit 302 to validate image data for authentication process. If no skin is detected in pattern light image through the data-driven skin detection mechanism disclosed herein, the operation is stopped and the authentication is not triggered, e.g. the device is not unlocked or an alternative unlock mechanism is triggered. If skin is detected in pattern light image through the data-driven skin detection mechanism disclosed herein, the operation is further pursued and the authentication is triggered.

For such sensitive operations like authentication based on biometric data of the user, processing module 300 may include secure zone(s). Secure zone(s) may encapsulate certain resources configured to authenticate the user and handling sensitive biometric information in encrypted environment. Secure zone(s) may protect an isolated, internal resource from being directly accessed by an external circuit. The internal resource may be memory that stores sensitive data such as biometric information, encryptions keys, or the like.

Facial recognition process may run in the secure zone based on images captured by camera 106 and processed by image processing unit 302. The functions of recognition process may be performed in secure zone. One example may be the enrollment process. During the enrollment process, camera 106 may capture or collect images and/or image data from an user to be authorized to subsequently authenticate the user using the facial recognition authentication process. From images of the enrollment process templates may be generated and stored in secure zone storage. Another example may be the authentication process based on the flood light image. For facial authentication camera 106 may communicate image data to processing unit with secure zone via a secure channel. The secure channel may be, for example, either a dedicated path for communicating data (i.e., a path shared by only the intended participants) or a dedicated path for communicating encrypted data using cryptographic keys known only to the intended participants. Secure zone processing unit may operate one or more machine learning models. One or more neural network modules may be used to operate the machine learning models. Neural network modules may be located in secure zone. Secure zone may compare the image characteristics with stored templates for each type of image to generate an authentication score depending on a matching score or other ranking of matching between the user in the captured image and in the stored templates. The authentication scores for the images such as the flood IR and patterned illumination images may be combined to decide on the identity of the user and, if authenticated, allow the user to use device e.g., unlock the device. If authenticated, operating parameters such as unlock application, device or other are generated. If not authenticated, the authentication is not successful, e.g. the device is not unlocked or an alternative unlock mechanism is triggered.

For authentication flood light image data may be processed to provide material recognition. For authentication flood light image data may be processed to provide facial recognition and authentication. The flood light image(s) may be analyzed for facial features by the neural network configured to generate at least one biometric authentication information. For example, the neural network may generate facial feature vectors. The feature vectors may be compared to template feature vectors. The template feature vectors may be provided from a template storage, such as secure zone storage, to generate a matching score. The templates feature vectors may be generated from an enrollment of an authorized user on the device (e.g., a template generated during an enrollment process). The, matching score may be a score of the differences between facial feature vectors and corresponding template vectors (e.g., feature vectors for the authorized user generated during the enrollment process). Matching score may be higher when feature vectors are closer to (e.g., the less distance or less differences) to the template feature vectors.

Comparing feature vectors and template vectors to get a corresponding matching score may include using one or more classifiers or a classification-enabled network to classify and evaluate the differences between the generated feature vectors and feature vectors from the template.

Examples of different classifiers that may be used include, but are not limited to, linear, piecewise linear, nonlinear classifiers, support vector machines, and neural network classifiers. In some embodiments, matching score may be assessed using distance scores between feature vectors and templates.

For authentication, matching score may be compared to an unlock threshold for device. The unlock threshold may represent a minimum difference in feature vectors between the face of the authorized user according to template vectors and the facial feature vector of the user on the attempt to unlock the device. For example, the unlock threshold may be a threshold value that determines whether the unlock facial feature vectors are close enough to the template vectors associated with the authorized user's face.

Figure 6:
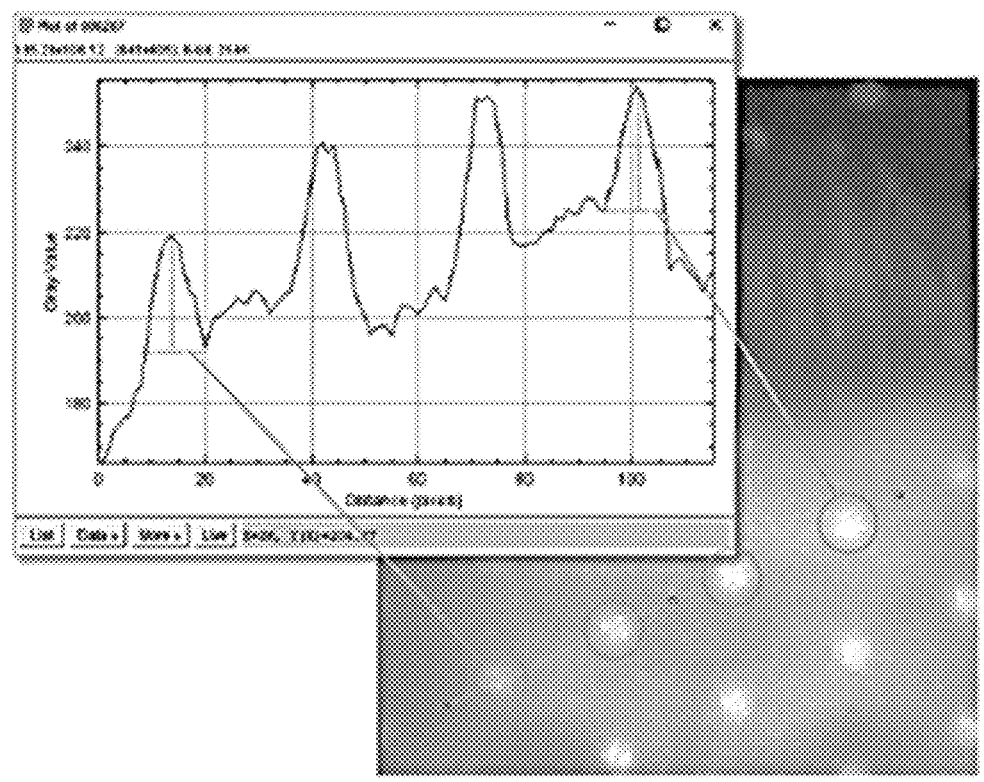
FIG. 6 illustrates a pattern image and a signal resulting from the pattern light image.

FIG. 6 illustrates a pattern image and a signal resulting from the pattern light image.

The pattern light image illustrated may be captured while the user's face is illuminated with IR pattern light illuminator(s) 212. The signal resulting from such image data is illustrated along one line of pattern reflections received by the image sensor, such as a CMOS or CCD based sensor 200. The y axis in this case illustrates the gray value on the gray scale of the image. The x-axis illustrates the position along the line illustrated in the image. The reflected light pattern signal can be characterized by the maxima at specific locations on top of the background texture signal information. The reflected light patterns can further be characterized by the width of the light distribution. The reflected light patterns inherently include physical characteristic of the object the patterns are reflected from. In particular luminescence, reflectivity and light distribution are characteristic of the material surface the like is reflected from and the distance. Such characteristics of the object the light is reflected from may be extracted from the pattern light image by using filtering techniques known from beam profile analysis. Such techniques are described in WO2020187719A1, which is herewith incorporated by reference. Techniques rely on data-driven techniques, which will be further described illustratively e.g. in the context of FIGS. 7 to 9.

FIG. 7 illustrates an example flowchart of methods for pre-processing pattern light images.

Image pre-processing may include detecting a bounding box around the face in the flood light image. Such bounding box may be detected via model such as neural network or via commonly known techniques for bounding box determination in face recognition. Furthermore, landmarks may be determined. The bounding box and the landmarks may be associated with the corresponding pixels in the pattern light image data. In particular, the pattern light image data associated with the face and within the bounding box from the flood light image may be used to crop the pattern image to the region of interest. In other embodiments pre-defined bounding box may be used. Such boxes may be displayed to the user when taking the image.

Images may be pre-processed for extracting material information. One pre-processing may include digitally manipulating image data. In particular images may be manipulated by image augmentation techniques such as cropping, rotating, blurring, or the like. Through such manipulation the background information with the facial features may be suppressed. For extraction of the material information the pattern is of interest. Hence any model extracting the material information may be trained on manipulated image data. This way the size of the model can be reduced. This way storage and processing of the model on the smartphone can be significantly reduced.

Figure 8A:
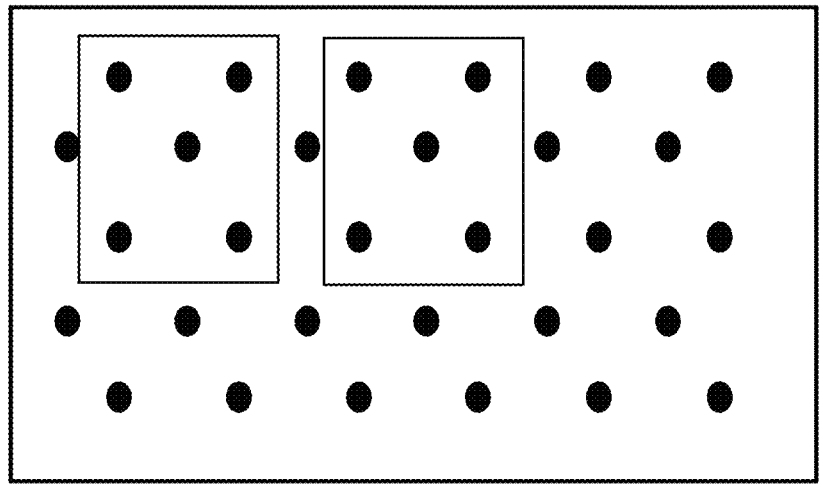
FIGS. 8a-c illustrate examples of methods for generating partial images from pattern images.
Figure 8B:
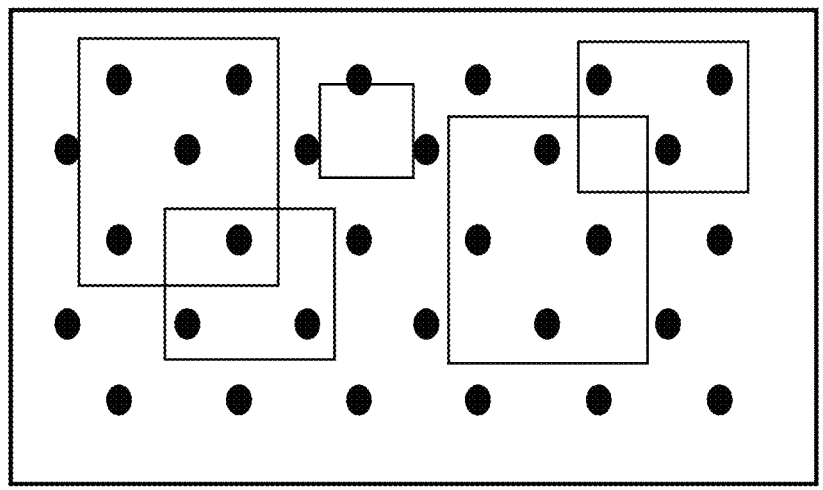
Figure 8C:
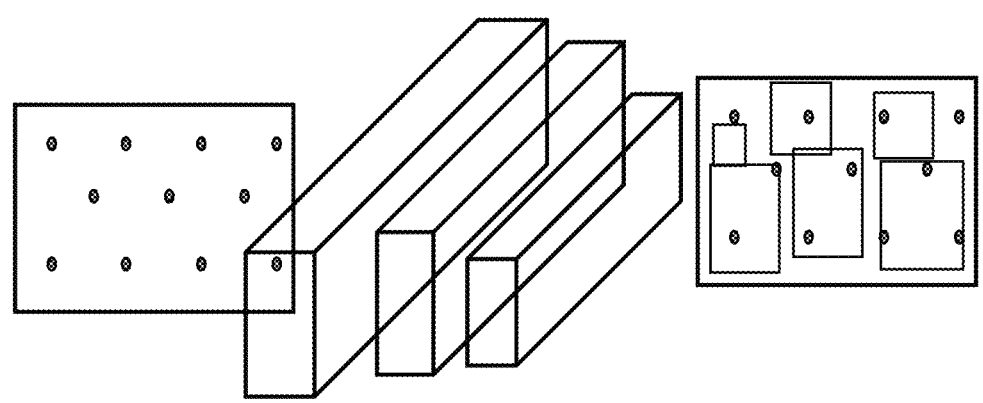

One option to do so is by cropping the images into partial images (FIGS. 8a-c). FIGS. 8a-c illustrate examples of methods for generating partial images from pattern images.

Cropping may be based on identifying peaks of pattern and cropping a certain size around the peaks. In such embodiment the peak may be at the center of the image (see FIG. 8a). The partial images may have a fixed size and may not overlap. In another embodiment the cropping may be random in terms of position of the peaks (FIG. 8b). The partial images may have any size. The partial images may overlap. The partial images may comprise at least one pattern feature (intensity peak) or more pattern features. The partial images may comprise parts of pattern features or outlier signatures of pattern features. Other options for partitioning manipulation include object detection algorithms such as single shot detection (SSD or region based CNNs for region based neural network) to provide bounding boxes for partial image cut-outs. Such manipulation may be based on cut-outs via anchor points for pattern features of pattern image (cropping or SSD or RCNN, FIG. 8c).

From partial images material may be recognized. Such recognition may be based on a data-driven model. such as a trained neural network such as a convolutional neural network. The training of such network will be lined out in more detail below. The model may be parametrized to map the partial images to a classifier such as human skin or no human skin, material or no material or specific material classes. The model may also be parametrized to more complex outputs such as human skin, material class (latex, silicon, fabric) or the like.

Based on such recognition the authentication process may be validated. For instance, if no human skin is detected in image, the authentication process may be stopped, and a notification may be provided to the user. In such case authentication is not possible or spoofing is likely (anti spoof). If skin is detected, the validation may lead to further processing such as providing material present in the image. Such material detection may be associated with landmarks e.g. as detected in flood light image for consistency check. The consistency check may include a rule set. If for instance, latex is detected to be associated with the eyes, then the authentication process may be stopped. The material recognition and validation step may also be performed after face recognition.

Figure 9:
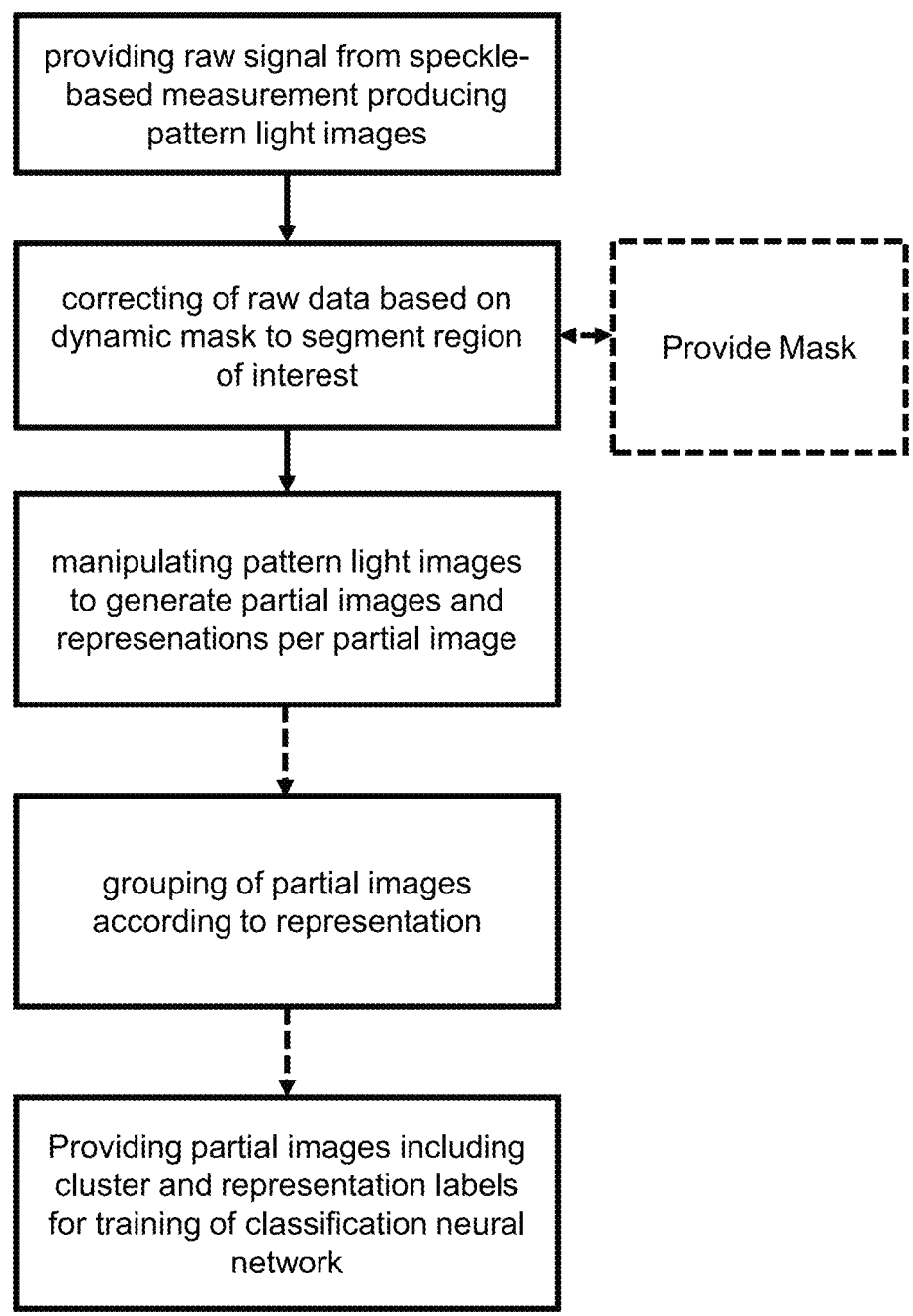
FIG. 9 illustrates an example of a method for training a data driven model configured to detect material based on partial images.

FIG. 9 illustrates an example of a method for training a data driven model configured to detect material based on partial images.

Raw image signal from speckle-based measurement producing pattern light images may be provided. The raw image data may be corrected based on dynamic mask to segment the region of interest, e.g. the face. Pattern light images labelled with the material information, such as skin/no-skin, material/no material or specific material classes may be provided as training data.

The pattern light image data may be manipulated to generate partial images, representations per partial image and clustered partial images.

The training data may be cropped as described in the context of FIGS. 8a-c. After cropping the signal signature of the background texture of the object (background light plus face features) is already randomized. However, such randomization may not be sufficient to extract material information. In particular for approaches that rely on data-driven models, the attention in the training process may be focused on the pattern signature (material) and not the background (face features). Different approaches to further suppress the background signature in the images may be applied.

One process may rely on PCA (Principle component analysis) or RBF (Radial basis function (RBF) neural network) to generate a representation of the partial images. Such representation is a manipulation in the sense of reducing dimensionality of the partial image. The partial image is hence mapped to a lower dimensional representation of the image. The representation is associated with the physical signature embedded in the reflections of the partial image and further suppresses the background signature. Based on the PCA or RBF mapping representations of the partial images may be generated. These may be associated to the corresponding images.

Another process for generating representations may include the manipulation of the partial images via a neural network structure including encoder and decoder. The neural network may be a CNN suitable to for image processing. The encoder part of the CNN may generate the representation and the decoder part may generate the partial image. By comparing the partial image at the input layer of the encoder network with the partial image at the output layer of the decoder network, the representation may be trained. Following such training each partial image may be associated with one representation trained by the network that further suppresses the background signature by dimensionality reduction.

Other options to build low level representations of the partial images are FFT, wavelets, deep learning, like cnns, energy models, normalizing flows, gans, vision transformers, or transformers used for natural language processing, autoregressive image modelling, GANs, Autoregressive Image Modeling, Normalizing Flows, Deep Autoencoders, Deep Energy-Based Models, Vision Transformers. Supervised or unsupervised schemes may be applicable to generate representation (also embedding in e.g. cosine or Euclidian metric in in ML language).

Once the representations are generated, the partial images and the representation may be grouped. Grouping may include clustering the partial images via clustering algorithm such as k-means or elbow curve into groups. Other clustering methods are possible. Once the representations are generated, they may be assigned to PCA clusters or clustered through an algorithm.

From the representation and potentially the clustering, manipulated image data for extracting material information from a pattern image acquired by an IR sensor may be generated. The manipulated image data may include the partial images with at least part of the pattern features present in the pattern image and at least one representation associated with the physical signature embedded in the reflections of the partial image or at least one class associated with the representation.

Based on such manipulated image data a data driven model can be trained. By manipulating the data in such a way, the texture or background signature can be suppressed. This is in contrast to face recognition, where the texture of the object includes the facial features, the model is trained on. In material classification the pattern and its relation to material signatures are embedded in the training process.

For training of the data driven model for extraction of a skin feature supervised or self-supervised learning may be used. The manipulated data may include known data for the partial images. For instance, the training data set of pattern images may be labelled with skin/no-skin labels. Such labels may be carried through the manipulation for the partial images. The manipulation may be carried out as described above.

The manipulated data including representation, label and cluster may be fed into a classifier network such as CNNs using supervise or self-supervised learning techniques. For example, Resnet, triplet loss, npx loss or npair loss may be used. The representation and the cluster may be used as input on the input layer of the network or via the model loss function, e.g. via contrastive divergence loss function. Other options are cost function, error function, objective function. This way the manipulated data including representation and cluster may be part of the model's training process.

Neural network embeddings may include learned low-dimensional representations of discrete data as continuous vectors. These embeddings overcome the limitations of traditional encoding methods and can be used for purposes such as finding nearest neighbors, input into another model, and visualizations. Embeddings may be used to project representation or embedding to human skin—no skin as binary classifier.

The material information extracted from the trained model may relate to the labels. If the label is a binary classifier discriminating between material/no-material or human skin/no human skin, the network classifies partial images accordingly. If the labels include more metadata such as additional annotations per masks, mask materials like silicon, latex mask or mask brand, the network classifies partial images accordingly. Additional metadata may include external context like facial features such as beard, glasses, hat aso.

The thus trained data-driven model. may be provided to the device for extracting material information, e.g. through classification based on partial images generated from the pattern light images.

Figure 10:
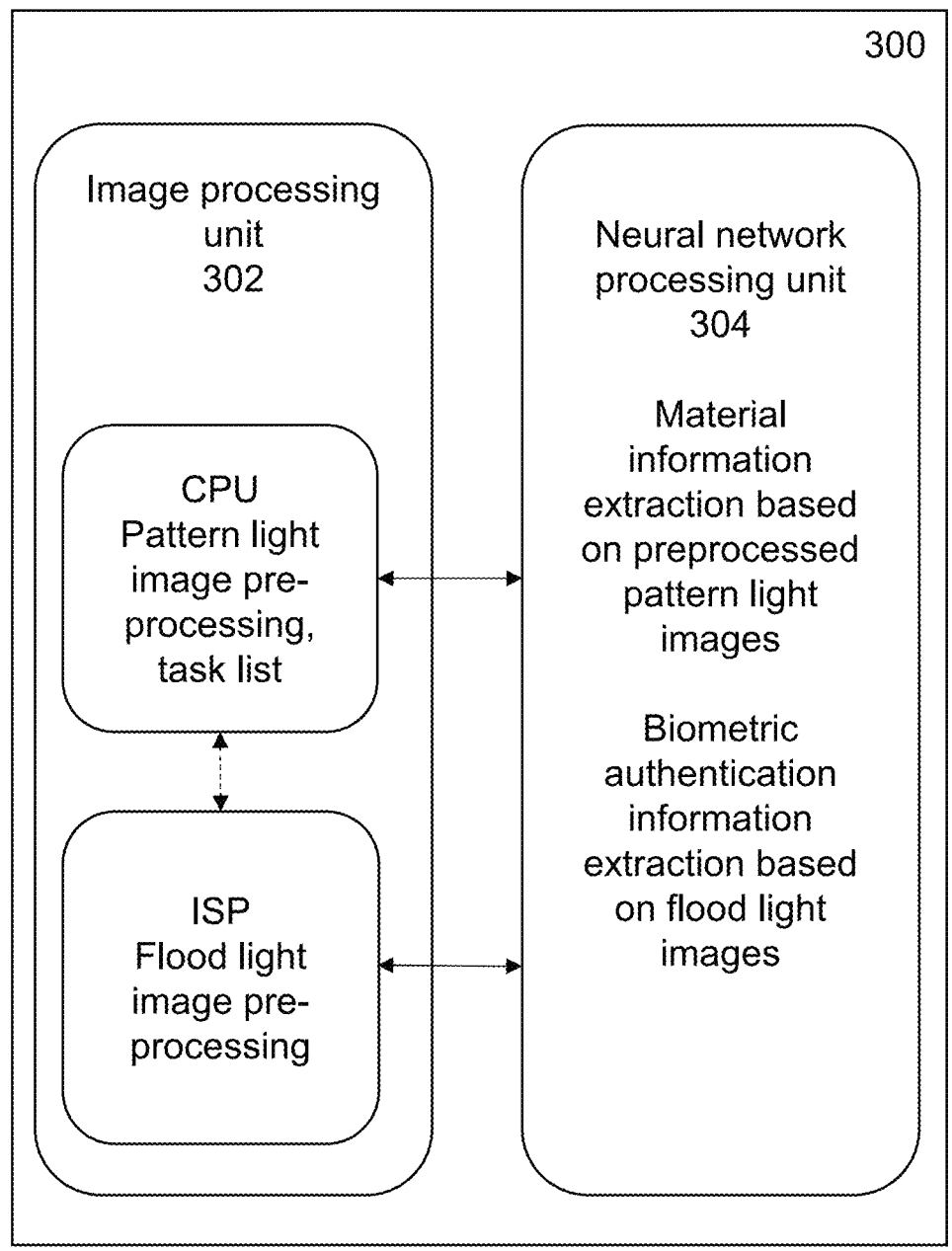
FIG. 10 illustrates an example block diagram with an image processing unit configured to execute image pre-processing and a neural network processing unit configured to execute material detection.

FIG. 10 illustrates an example block diagram with an image processing unit configured to execute image pre-processing and a neural engine configured to execute material detection.

The image processing unit 302 may include CPU and ISP. The CPU may pre-process pattern light image(s) for extracting material information from the partial images by the neural network processing unit. The pre-processing may include a lightweight algorithm of cropping the pattern light images into partial pattern light images or otherwise manipulating the pattern light images. The CPU may generate the task list for the generated manipulated, such as partial images to be provided to the neural network processing unit. The ISP may pre-process the flood light image(s) for extracting biometric authentication information from the flood light image(s) by the neural network processing unit. The CPU or the ISP may generate the task list for the generated flood light images to be provided to the neural network processing unit. In some embodiments the CPU may be configured to extract material information based on preprocessed pattern light images, e.g. as described in the context of FIGS. 5-9. In other embodiments the neural network processing unit 304 may be configured to extract material information based on preprocessed pattern light images, e.g. as described in the context of FIGS. 5-9.

The ISP may pre-process the flood light image(s) for extracting biometric authentication information from the flood light image(s) by the neural network processing unit. The CPU or the ISP may generate the task list for the generated flood light images to be provided to the neural network processing unit.

The neural network processing unit 304 may be configured to extract material information based on preprocessed pattern light images. The neural network processing unit 304 may be configured to extract biometric identification information extraction on flood light images. The material information and the biometric authentication or identification information may be provided to the CPU for triggering the requested operation to be performed by the device. For example, the device may be unlocked upon successful authentication be the user. In other embodiments the CPU may be configured to run the material detection. CPU may be configured to extract material information based on preprocessed pattern light images. The lightweight operations used for material detection as described in the context of FIGS. 5-9 allow for using the CPU, while the ISP and the neural network processing unit 304 are being used for the performance heavier face authentication/identification processing.

Figure 11:
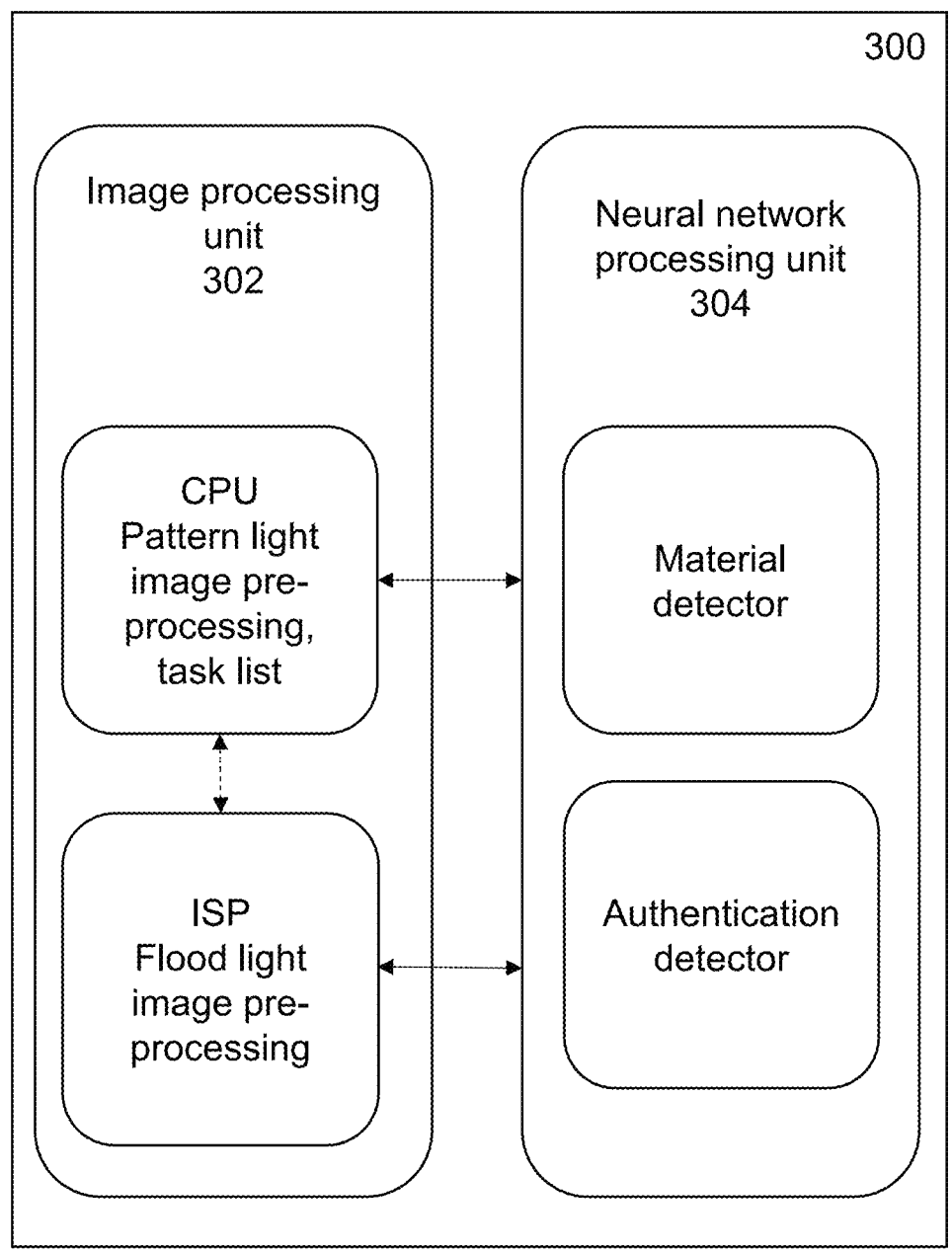
FIG. 11 illustrates an example block diagram with an image processing unit configured to execute image pre-processing and a neural network processing unit configured to execute material and biometric authentication detection.

FIG. 11 illustrates an example block diagram with an image processing unit configured to execute image pre-processing and a neural network processing unit configured to execute material and biometric authentication detection.

The image processing unit 302 and the neural network processing unhit 304 may be components of a System on Chip (SoC) processing module 300. The Image processing unit 302 may comprise the central processing unit CPU configured to perform general purpose operations and the image signal processor ISP configured to perform image specific operations. The neutral network processing engine 304 may include one or more SoC components configured to perform neural network specific operations, such as convolution, pooling, or full connection. Depending on the architecture of the neural network the neutral network processing engine 304 may comprise one or more components configured to process neural different network specific operations per component.

The neutral network processing engine 304 may be configured to perform material detection and/or biometric authentication based on neural network trained and configured to perform such such operations. The neutral network processing engine 304 may be configured to perform material detection on one component and biometric authentication on another component depending on the neural network architectures and operations required to perform such operations, respectively. The material detection may be implemented as described for example in the context of FIGS. 4-10 based on the data-driven model including the neural network configured to extract material information. The biometric authentication detection may be implemented as described for example in the context of FIGS. 4-10 based on the data-driven model including the neural network configured to extract biometric authentication information.

Figure 12:
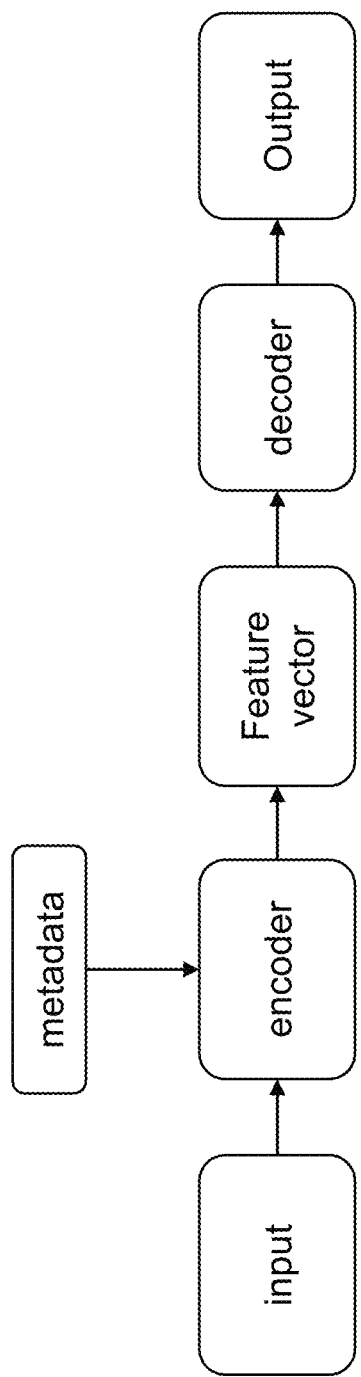
FIG. 12 illustrates an example of a training process of a neural network to extract image properties to be provided to the biometric authentication detector.

FIG. 12 illustrates an example of a training process of a neural network to extract image properties, such as material and/or biometric properties, to be provided to the biometric authentication detector.

The neural network may be based on an encoder-decoder architecture. The neural network may include at least one encoder and at least one decoder. Encoder and decoder may be implemented on the SoC structures described herein. The neural network processing unit may be configured to train the encoder and/or decoder and/or execute the trained encoder and/or trained decoder. The neural network processing units may include a GPU-enabled computer processor. Training neural network on the GPU-enabled computer processor may output weights or kernels that are described using floating-point numbers. In such embodiments, the floating-point operating parameters may be converted to integer number representations to be used on neural network processing unit.

The encoder and/or decoder may include at least one convolutional neural network (CNN). The encoder and/or decoder may include other types of networks or functions such as FFT, wavelets, deep learning, like CNN, energy models, normalizing flows, a recurrent neural network (RNN), a gated recurrent unit (GRU), a long short-term memory (LSTM) recurrent neural network, vision transformers, or transformers used for natural language processing, autoregressive image modelling, Autoregressive Image Modeling, Normalizing Flows, Deep Autoencoders, Deep Energy-Based Models, Vision Transformers or the like. Supervised or unsupervised schemes may be applicable to generate representation. The encoder and/or decoder may include at least one multi-scale convolutional neural network. Using a multi-scale convolutional neural network, encoder may generate the representation of the input image based on feature vectors in the feature space. For example, encoder process may generate a 32×32 grid representation with a feature vector in each region (cell) of the grid from the input image that may have a higher resolution such as 256×256 image. The encoder and the decoder may be based on the same or different networks or functions. The encoder architecture may differ to the decoder architecture. The encoder and decoder may have the same architecture.

The training process of the encoder-decoder architecture may include providing training data set(s) including image data and associated metadata, in particular image properties such as biometric or material properties. The image data may include flood light images, RGB images and/or pattern light images of user(s) under illumination by the respective light. The training process of the encoder-decoder architecture may include providing training data including image data and meta data as input to the encoder-decoder. The image data may include images such as flood light images, RGB images and/or pattern light images. The image data may include manipulated, such as partial, images generated from pattern light images. The image data may include labelled images including metadata associated with image properties, such as face properties like eyes, nose, mouth, pose, pitch, yaw, and/or roll, or material properties, such as material type, skin, organic material, inorganic material, material class, manipulated image representation such as partial image representation (or feature vector as generated e.g. by the method described in the context of FIGS. 8a-c), manipulated such as partial image size, spot number in manipulated such as partial image, face region of manipulated image, texture, skin type, distance to image or partial image, translucence and/or luminescence.

Material properties may relate to the material information extracted e.g. as described in the context of FIG. 5 or 9. Material properties may relate to the material type such as, but not limited to, skin, organic material, inorganic material, material class, texture and/or skin type. Material properties may relate to the process of material information extraction, e.g. manipulated pattern light image(s) the material information are generated from or the process of extracting material information from the pattern light image(s) such as, but not limited to, manipulated image representation such as partial image representation (or feature vector as generated e.g. by the method described in the context of FIGS. 8a-c), manipulated such as partial image size, spot number in manipulated such as partial image, face region of manipulated image, distance to image or partial image, translucence related image signatures and/or luminescence related image signatures. Input to the encoder-decoder architecture may include a plurality of training images with different users and/or faces in the images. The faces in the images may have varying properties, such as face, material and/or material detection properties. The properties of the faces and/or materials presents in the training images may be known. The known information for the properties may be provided into training process as metadata. The training images may hence be augmented by metadata including face, material and/or material detection properties.

The operation on images trained by the encoder-decoder architecture may include, but not be limited to, face detection, facial feature detection (e.g., landmark (eyes, nose, mouth, etc.) detection, gaze estimation, smile estimation, etc.), facial pose estimation, occlusion detection, attention detection, facial recognition authentication (e.g., facial matching), material detection or any other process involving a neural network module operating on images with faces to assess properties or features of the faces.

For training the input may be provided to the encoder. The encoder may define features in the images as feature vectors in a feature space. For example, the encoder may define facial features of the flood light image of the face and/or material features of the pattern image of the face as feature vectors in the feature space e.g. as described in the context of FIG. 5 or 9. The feature vectors may include feature vectors representing the user's facial features and/or material features in a feature space. A feature space may be an n-dimensional feature space. A feature vector may be an n-dimensional vector of numerical values that define features of the image for a region in the feature space that corresponds to a region in the image. The number of dimensions may depend on the embodiment. For example, in the case of material features the feature vectors may refer to representations of the partial images as described for example in the context of FIG. 5 or 9.

The representations and/or feature vectors generated by the encoder may be provided to decoder. The decoder may decode the representations or feature vectors. The decoder may include a neural network, such as a recurrent neural network (RNN), a gated recurrent unit (GRU), a long short-term memory (LSTM) recurrent neural network or any architecture referred to above. Decoding the representations or feature vectors may include mapping the feature vectors via a regression network to determine (e.g., extract) output data from the input. Decoding the representations or feature vectors may include mapping the feature vectors to one or more classifiers by a classification network to determine output data from image input. Output data from image input may relate to face, material and/or material detection properties.

Output generated by the decoder may include information or properties such as face, material and/or material detection properties of the image input. For training, the properties of the image input may be known and may be correlated with the decoded feature vectors. As decoder operates on feature vectors in the feature space, the decoder may provide one or more predictions for the properties of the image input based on the correlation between known property and feature vectors. The assessed image properties may include, but not be limited to, biometric properties, such as those of a face like position of the face in the image, such as a bounding box for the face, a pose of the face, such as pitch, yaw, and/or roll of the face, a distance between the face and the camera, landmark positions, gaze estimation for the face, smile estimation for the face, occlusion detection, and/or material properties, such as material type, spot number, manipulated such as partial image size, face region, textures (skin type), distance sensor to imaged object, translucence and/or luminescence.

By training, the properties, of the image may be determined by correlating decoded feature vectors with metadata. For example, metadata may provide known properties of the face(s) in image input with the known properties defining the properties assessed by decoder process. For example, metadata may provide known properties of the material(s) in image input with the known properties defining the properties assessed by decoder process. Correlating decoded feature vectors with metadata may include the decoder assessing differences between decoded feature vectors and metadata. The encoder-decoder architecture may thus perform error function analysis on the differences between the decoded feature vectors for given metadata and refine the feature vector decoding process until the feature vector decoding process accurately determines the metadata. Thus, the decoder-encoder architecture may be trained by the training images and metadata to accurately determine image properties, such as biometric and/or material properties.

Figure 13:
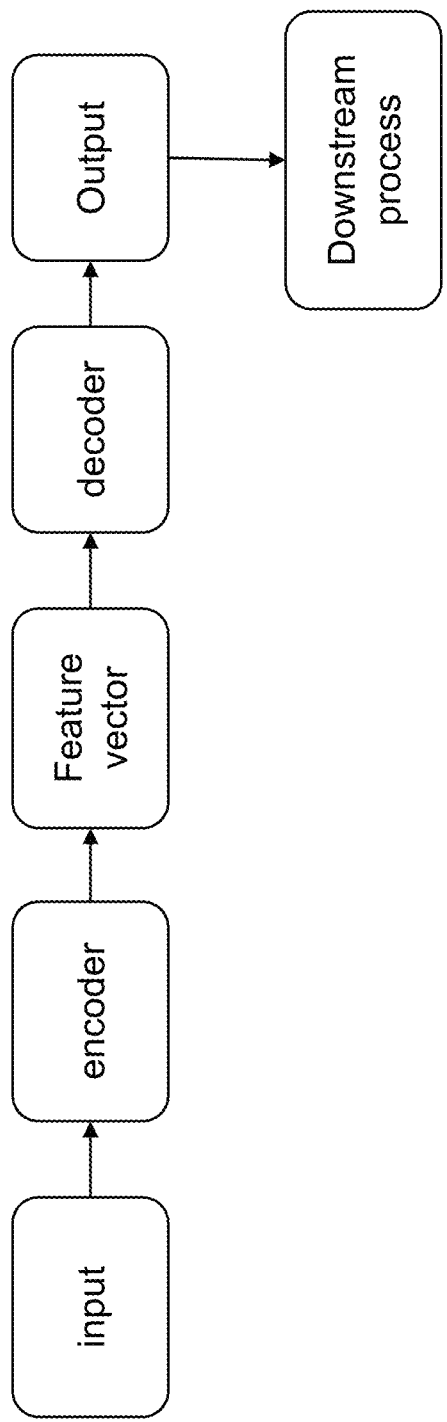
FIG. 13 illustrates an example of providing the extracted image properties to the biometric authentication detector.

FIG. 13 illustrates an example of providing the extracted image properties to the biometric authentication detector.

Based on the trained encoder-decoder structure as described for example in the context of FIG. 12 or on the model trained for material extraction as described in the context of FIGS. 5-9, image properties, such as biometric and/or material properties, may be derived and provided to a downstream process such as the biometric authentication detector or a neural network configured to generate at least one biometric authentication information. The biometric authentication information may include a matching score between at least one facial feature vector generated from an image taken on an unlock event and at least one template vector stored for an authorized user. The generation of the biometric authentication information may include the image properties, such as biometric and/or material properties.

For authentication flood light image data may be processed to provide facial recognition and authentication. The flood light image(s) may be analyzed for facial features by the neural network configured to generate at least one biometric authentication information. The neural network configured to generate at least one biometric authentication information may be trained on flood light image data to generate facial feature vectors. For example, the neural network may generate facial feature vectors. The feature vectors may be compared to template feature vectors. The template feature vectors may be provided from a template storage, such as secure zone storage, to generate a matching score. The templates feature vectors may be generated from an enrollment of an authorized user on the device (e.g., a template generated during an enrollment process). The templates feature vectors may be generated from an enrollment of an authorized user on the device by the neural network configured to generate at least one biometric authentication information. The matching score may be a score of the differences between facial feature vectors and corresponding template vectors (e.g., feature vectors for the authorized user generated during the enrollment process). Matching score may be higher when feature vectors are closer to (e.g., the less distance or less differences) to the template feature vectors.

Comparing feature vectors and template vectors to get a corresponding matching score may include using one or more classifiers or a classification-enabled network to classify and evaluate the differences between the generated feature vectors and feature vectors from the template. Examples of different classifiers that may be used include, but are not limited to, linear, piecewise linear, nonlinear classifiers, support vector machines, and neural network classifiers. In some embodiments, matching score may be assessed using distance scores between feature vectors and templates.

For authentication, matching score may be compared to an unlock threshold for device. The unlock threshold may represent a minimum difference in feature vectors between the face of the authorized user according to template vectors and the facial feature vector of the user on the attempt to unlock the device. For example, the unlock threshold may be a threshold value that determines whether the unlock facial feature vectors are close enough to the template vectors associated with the authorized user's face.

Other non-limiting examples of downstream processes related to biometric authentication information using prior properties may include: A facial recognition authentication process using pose information (e.g., pitch, yaw, and roll data) to increase accuracy in assessing matching of the face with the registered user, or a landmark detection process using occlusion information to mask off occluded areas more quickly and accurately for generating positions of the landmarks.

To improve the generation of at least one biometric authentication information, the biometric and/or material property may be provided to the neural network generating the biometric authentication information. The biometric property generation may be executed by the one or more image processing units such as central processing unit(s) CPU e.g. via the network architecture described in the context of FIG. 12 or 13. The material property generation may be executed by the one or more central processing unit(s) CPU e.g. via the network architecture described in the context of FIG. 12 or 13. The biometric property generation may be executed by the one or more image processing unit(s), such as central processing unit(s) CPU or image signal processor(s), or neural network processing unit(s) e.g. via the network architecture described in the context of FIG. 12 or 13. The biometric property generation may be executed by the one or more neural network processing unit(s) e.g. via the network architecture described in the context of FIG. 12 or 13. The material property generation may be executed by the one or more neural network processing unit(s) e.g. via the network architecture described in the context of FIG. 12 or 13 or FIGS. 5-9. The material property generation may be executed by the one or more image processing unit(s), in particular the one or more central processing unit(s) CPU e.g. via the network architecture described in the context of FIG. 12 or 13 or FIGS. 5-9. The material property generation may include the methods as described in the context of FIG. 12 or 13 or FIGS. 5-9.

Figure 14:
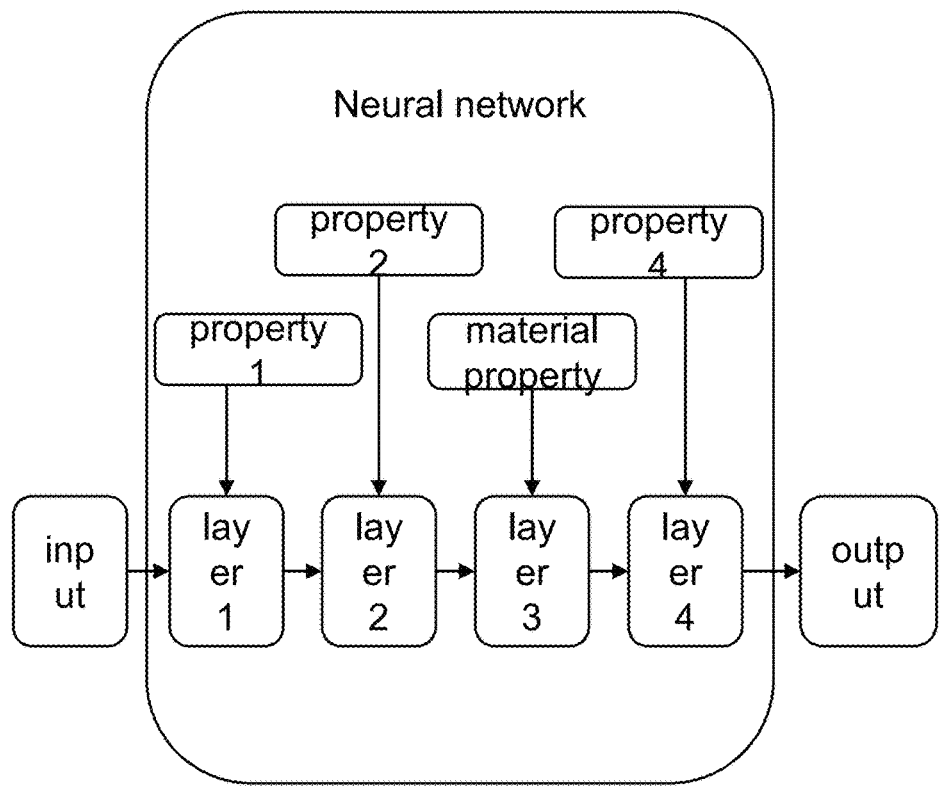
FIG. 14 illustrates an example of providing the extracted image properties to the biometric authentication detector.

FIG. 14 illustrates another example of providing the extracted image properties to the biometric authentication detector.

As illustrated in this embodiment different properties extracted from the image including the material properties may be provided to at least one layer of the neural network configured to generate authentication information. The material property may be extracted e.g. as described in the context of FIGS. 12 and 13. The material property may be material information extracted e.g. as described in the context of FIG. 5 or 9. The material property may be material information relating to the partial image(s). The biometric property may be extracted e.g. as described in the context of FIGS. 12 and 13. The further properties such as biometric properties may include facial properties such as gaze, landmarks, pose including e.g. pitch, yaw, and/or roll, or the like.

The neural network may operate using one or more convolutional layers (e.g. weight×input). The image properties, such as material properties and/or biometric properties, may be applied separately to different layers or at least part of the properties may be applied jointly to a single layer or single layers. The image properties, such as material properties and/or biometric properties, may be applied to different or the same layer of the of the neural network configured to generate authentication information. The application scheme of the properties may be part of the training. Training may include, for example, defining affects for the different properties to determine the order in which one or more properties are applied to which layer. Application of these properties to the neural network configured to generate authentication information may assist to determine the authentication information. The biometric and/or material properties may be applied to the neural network configured to generate at least one biometric authentication information and trained on flood light image data to generate facial feature vectors. The biometric and/or material properties may be applied to one or more classifiers or a classification-enabled network(s) to classify and evaluate the differences between the generated feature vectors and feature vectors from the template.

The properties, such as material and/or biometric properties, may be provided as scalar values. to the neural network configured to generate authentication information (e.g. weight×input+bias). The properties, such as material and/or biometric properties, may be provided as weights applied in the convolution to the neural network configured to generate authentication information (e.g. weight×input+bias). The properties, such as material and/or biometric properties, may be provided as weighted properties as input to the neural network configured to generate authentication information. For example, a weighted combination for input to the network may include a first weight applied to a first property, a second weight to a second property, a third weight to a third property aso. The properties, such as material and/or biometric properties, may be provided as constraints or boundaries to the neural network configured to generate authentication information. Providing the properties as constraints or boundaries may reduce the search space for the neural network to assess and determine authentication information.

The properties, such as material and/or biometric properties, may be provided as an operator. Operators may be applied to output of one or more of the network layers. Thus, operators may update the input of the following layer based on the applied operator. Operators may be generic operators or functions generated to map property data. Operators may be masking functions to mask the output of a network layer being used as input for the following network layer. Masking or closing off parts of the input may reduce the search space for the network layer, which may improve accuracy and speed of the network layer in determining an output. The properties may be applied to the neural network configured to generate authentication information using other methods. For example, a combination of the methods described may be used as input for individual network layers.

Figure 15:
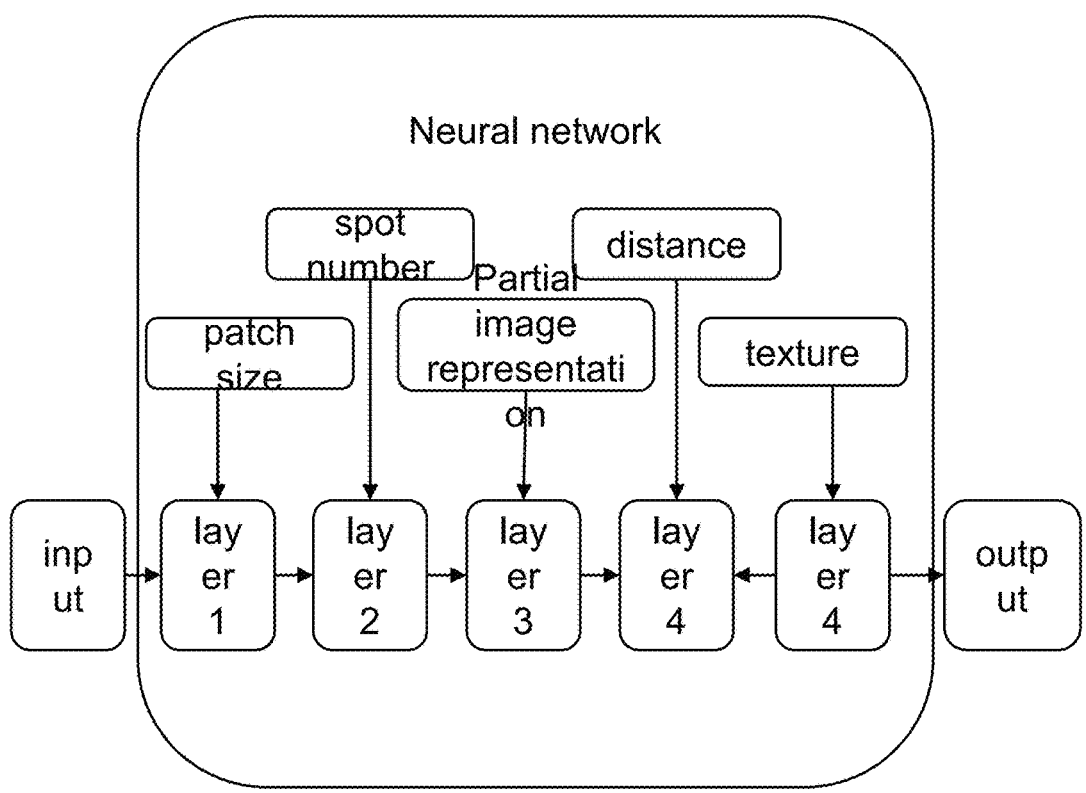
FIG. 15 illustrates an example of providing the extracted image properties to the biometric authentication detector.

FIG. 15 illustrates another example of providing the extracted image properties to the biometric authentication detector.

As illustrated in this embodiment different properties extracted from the pattern light image(s) including one or more material properties may be provided to at least one layer of the neural network configured to generate authentication information. The one or more material properties may include representations of partial images, partial image size, spot number in partial image, face region of partial image, texture of partial image, distance of face to camera for partial image, luminescence or the like. This way the material information from the pattern light image may be baked into the generation of biometric authentication information, which may improve accuracy and speed of the network layer in determining the biometric authentication information. As described in the context of FIG. 14, the properties may be applied by different methods.

The present disclosure has been described in conjunction with preferred embodiments and examples as well. However, other variations can be understood and effected by those persons skilled in the art and practicing the claimed invention, from the studies of the drawings, this disclosure and the claims.

Any steps presented herein can be performed in any order. The methods disclosed herein are not limited to a specific order of these steps. It is also not required that the different steps are performed at a certain place or in a certain computing node of a distributed system, i.e. each of the steps may be performed at different computing nodes using different equipment/data processing.

The present disclosure has been described in conjunction with preferred embodiments and examples as well. However, other variations can be understood and effected by those persons skilled in the art and practicing the claimed invention, from the studies of the drawings, this disclosure and the claims.

Any steps presented herein can be performed in any order. The methods disclosed herein are not limited to a specific order of these steps. It is also not required that the different steps are performed at a certain place or in a certain computing node of a distributed system, i.e. each of the steps may be performed at different computing nodes using different equipment/data processing.

As used herein "determining" also includes "initiating or causing to determine", "generating" also includes "initiating and/or causing to generate" and "providing" also includes "initiating or causing to determine, generate, select, send and/or receive". "Initiating or causing to perform an action" includes any processing signal that triggers a computing node or device to perform the respective action.

In the claims as well as in the description the word "comprising" or "including" or similar wording does not exclude other elements or steps and shall not be construed limiting to the elements or steps lined out. The indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation or further elements may be included.

Providing in the scope of this disclosure may include any interface configured to provide data.

This may include an application programming interface, a human-machine interface such as a display and/or a software module interface. Providing may include communication of data or submission of data to the interface, in particular display to a user or use of the data by the receiving entity.

Various units, circuits, entities, nodes or other computing components may be described as "configured to" perform a task or tasks. Configured to shall recite structure meaning "having circuitry that" performs the task or tasks on operation. The units, circuits, entities, nodes or other computing components can be configured to perform the task even when the unit/circuit/component is not operating. The units, circuits, entities, nodes or other computing components that form the structure corresponding to "configured to" may include hardware circuits and/or memory storing program instructions executable to implement the operation. The units, circuits, entities, nodes or other computing components may be described as performing a task or tasks, for convenience in the description. Such descriptions shall be interpreted as including the phrase "configured to." Any recitation of "configured to" is expressly intended not to invoke 35 U.S.C. § 112(f) interpretation.

In general, the methods, apparatuses, systems, computer elements, nodes or other computing components described herein may include memory, software components and hardware components. The memory can include volatile memory such as static or dynamic random-access memory and/or nonvolatile memory such as optical or magnetic disk storage, flash memory, programmable read-only memories, etc. The hardware components may include any combination of combinatorial logic circuitry, clocked storage devices such as flops, registers, latches, etc., finite state machines, memory such as static random-access memory or embedded dynamic random-access memory, custom designed circuitry, programmable logic arrays, etc.

Any disclosure and embodiments described herein relate to the methods, the systems, apparatuses, devices, chemicals, materials, computer program elements lined out above and vice versa. Advantageously, the benefits provided by any of the embodiments and examples equally apply to all other embodiments and examples and vice versa.

All terms and definitions used herein are understood broadly and have their general meaning.

The invention claimed is:

1. A device for generating biometric authentication information, the device with instructions, which when executed on one or more processor(s), are configured to carry out the steps:

providing one or more pattern light image(s), wherein the pattern light image comprises an image of the user under illumination with at least one infrared pattern illuminator of the device;

generating one or more material properties from the one or more pattern light image(s); and generating biometric authentication information by providing the generated one or more material properties to at least one layer of at least one neural network, wherein:

generating one or more material properties includes manipulating pattern light image(s) and generating at least one material feature vector, wherein the at least one material feature vector is generated from providing manipulated pattern light image(s) to at least one neural network trained to generate the at least one material feature vector related to one or more material properties; or one or more flood light image(s) are provided, wherein the one or more flood light image(s) comprise an image of the user under illumination with light from at least one infrared flood illuminator of the device, wherein the one or more flood light image(s) are provided as input to at least one neural network configured to generate biometric authentication information.

2. The device of claim 1, wherein one or more material properties from the one or more pattern light image(s) are generated by manipulating pattern light image(s) and extracting one or more material properties from the pattern light image(s).

3. The device of claim 2, wherein manipulating includes manipulating the one or more pattern light image(s) to suppress background texture information from a region of interest, wherein manipulating the one or more pattern light image(s) to suppress background texture information from a region of interest includes performing an image augmentation technique on the pattern light image.

4. The device of claim 3, wherein a pixel location information for the region of interest, a binary skin classifier generated by the data-driven model trained to extract material information from manipulated pattern light image(s) and/or a material classifier generated by the data-driven model trained to extract material information from manipulated pattern light image(s) is used for authenticating the user by providing the pixel location information, the binary skin classifier and/or material classifier to at least one layer of at least one neural network trained to generate biometric authentication information.

5. The device of claim 1, wherein generating one or more material properties includes manipulating pattern light image(s) and generating at least one material feature vector, wherein the at least one material feature vector is generated from providing manipulated pattern light image(s) to at least one neural network trained to generate the at least one material feature vector related to one or more material properties.

6. The device of claim 5, wherein manipulating includes manipulating the one or more pattern light image(s) to suppress background texture information from a region of interest, wherein manipulating the one or more pattern light image(s) to suppress background texture information from a region of interest includes performing an image augmentation technique on the pattern light image.

7. The device of claim 6, wherein a pixel location information for the region of interest, a binary skin classifier generated by the data-driven model trained to extract material information from manipulated pattern light image(s) and/or a material classifier generated by the data-driven model trained to extract material information from manipulated pattern light image(s) is used for authenticating the user by providing the pixel location information, the binary skin classifier and/or material classifier to at least one layer of at least one neural network trained to generate biometric authentication information.

8. The device of claim 1, wherein generating one or more material properties includes providing the one or more manipulated pattern light image(s) to at least one data-driven model trained to extract one or more material properties from the manipulated pattern light image(s) and extracting one or more material properties from the manipulated pattern light image(s).

9. The device of claim 1, wherein manipulating pattern light image(s) includes generating partial image(s) with at least part of one or more pattern feature(s).

10. The device of claim 1, wherein manipulating pattern light image(s) includes generating a segmented image including the region of interest per pattern light image and generating per segmented image partial image(s) with at least part of one or more pattern feature(s).

11. The device of claim 1, wherein the manipulated pattern light image(s) are associated with a pixel location information for the region of interest.

12. The device of claim 1, wherein the data-driven model trained to extract material information from manipulated pattern light image(s) generates a material classifier discriminating between one or more material types.

13. The device of claim 1, wherein the data-driven model trained to extract material information from manipulated pattern light image(s) generates a binary skin classifier discriminating between skin and no-skin.

14. The device of claim 1, wherein the one or more material properties relate to at least one material type and/or at least one characteristic of the manipulation of the pattern light image(s) or wherein the one or more material properties relate to skin, an organic material, an inorganic material, an organic material class and/or an inorganic material class.

15. The device of claim 1, wherein the one or more material properties relate to at least one feature vector of at least one manipulated pattern light image(s), a size of manipulated pattern light image(s), a number of spot patterns of the manipulated pattern light image(s), a face region of the manipulated pattern light image(s), a texture, a skin type, a distance of the sensor the pattern light image was detected by to the object the pattern light image was reflected from, a translucence of the manipulated pattern light image(s) and/or a luminescence of the manipulated pattern light image(s).

16. The device of claim 1, wherein one or more biometric properties are generated from flood light image(s), wherein generating one or more biometric properties includes generating at least one biometric feature vector, wherein the at least one biometric feature vector is generated from providing flood light image(s) to at least one convolutional neural network trained to generate biometric properties.

17. The device of claim 1, wherein the one or more biometric properties relate to position properties of a biometric object and/or biometric feature(s) on the image.

18. The device of claim 1, wherein the biometric object relates to a face, wherein the one or more biometric properties relate to at least one facial position property including gaze, landmarks, pitch, yaw, and/or roll.

19. The device of claim 1, wherein one or more biometric properties are generated from flood light image(s), wherein the one or more biometric properties and the one or more material properties are provided to at least one layer of at least one neural network configured to generate biometric authentication information.

20. The device of claim 1, wherein providing the one or more material properties and/or biometric properties to at least one layer of the at least one neural network includes applying a bias, a weight, a functional relationship and/or an operator to at least one of an input channel, a neural network hidden layer and/or an output channel.

21. The device of claim 1, wherein the at least one neural network is configured to generate biometric authentication and includes at least one convolutional layer with a bias, a weight, a functional relationship and/or an operator, wherein providing the one or more material properties and/or biometric properties to at least one layer of the at least one neural network includes applying a bias, a weight, a functional relationship and/or an operator to at least one convolutional layer.

22. The device of claim 1, wherein the generated one or more material properties and/or biometric properties are weighted for providing to at least one layer of the at least one neural network.

23. The device of claim 1, wherein one or more flood light image(s) are provided, wherein the one or more flood light image(s) comprise an image of the user under illumination with light from at least one infrared flood illuminator of the device, wherein the one or more flood light image(s) are provided as input to at least one neural network configured to generate biometric authentication information.

24. The device of claim 1, wherein the at least one neural network is configured to generate biometric authentication information and generates at least one biometric feature vector based on a flood light image of the user of the device, wherein the at least one biometric feature vector is compared to at least one template vector related to the user to be authenticated.

25. The device of claim 1, wherein the biometric authentication information relates to a matching score between at least one biometric feature vector generated from the flood light image, taken on an event triggering authorization of the user of the device to perform at least one operation and at least one template vector stored for the user authorized to perform at least one operation.

26. The device of claim 1, wherein the biometric object relates to a face, wherein the one or more biometric properties relate to at least one facial position property including gaze, landmarks, pitch, yaw, and/or roll.

27. A method for generating biometric authentication information, the method comprising:
providing one or more pattern light image(s), wherein the pattern light image comprises an image of the user under illumination with at least one infrared pattern illuminator of the device;
generating one or more material properties from the one or more pattern light image(s); and
generating biometric authentication information by providing the generated one or more material properties to at least one layer of at least one neural network,
wherein providing the one or more material properties and/or biometric properties to at least one layer of the at least one neural network includes applying a bias, a weight, a functional relationship and/or an operator to at least one of an input channel, a neural network hidden layer and/or an output channel, wherein the generated one or more material properties and/or biometric properties are weighted for providing to at least one layer of the at least one neural network.

28. The method of claim 27, wherein the one or more material properties relate to at least one material type and/or at least one characteristic of the manipulation of the pattern light image(s).

29. The method of claim 27, wherein one or more biometric properties are generated from flood light image(s), wherein the one or more biometric properties and the one or more material properties are provided to at least one layer of at least one neural network configured to generate biometric authentication information.

30. The method of claim 27, wherein the one or more biometric properties relate to position properties of a biometric object and/or biometric feature(s) on the image.

31. An apparatus for generating biometric authentication information, the apparatus comprising:
 image providing interface configured to provide one or more pattern light image(s), wherein the pattern light image comprises an image of the user under illumination with at least one infrared pattern illuminator of the device;
 a material generator configured to generate one or more material properties from the one or more pattern light image(s); and
 a material property provider configured to generate biometric authentication information by providing the generated one or more material properties to at least one layer of at least one neural network,
wherein:
 generating one or more material properties includes manipulating pattern light image(s) and generating at least one material feature vector, wherein the at least one material feature vector is generated from providing manipulated pattern light image(s) to at least one neural network trained to generate the at least one material feature vector related to one or more material properties; or
 one or more flood light image(s) are provided, wherein the one or more flood light image(s) comprise an image of the user under illumination with light from at least one infrared flood illuminator of the device, wherein the one or more flood light image(s) are provided as input to at least one neural network configured to generate biometric authentication information.

* * * * *